US009645695B2

(12) United States Patent
Orita et al.

(10) Patent No.: US 9,645,695 B2
(45) Date of Patent: May 9, 2017

(54) DISPLAY APPARATUS

(71) Applicant: MITSUBISHI ELECTRIC CORPORATION, Chiyoda-ku (JP)

(72) Inventors: Tae Orita, Tokyo (JP); Naoki Nakagawa, Tokyo (JP); Takeshi Ono, Tokyo (JP); Masafumi Agari, Tokyo (JP); Seiichiro Mori, Tokyo (JP); Takashi Miyayama, Tokyo (JP); Takuji Imamura, Tokyo (JP); Tatsuya Nakamura, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/765,746

(22) PCT Filed: Mar. 7, 2014

(86) PCT No.: PCT/JP2014/001261
§ 371 (c)(1),
(2) Date: Aug. 4, 2015

(87) PCT Pub. No.: WO2014/136455
PCT Pub. Date: Sep. 12, 2014

(65) Prior Publication Data
US 2015/0378484 A1    Dec. 31, 2015

(30) Foreign Application Priority Data

Mar. 7, 2013    (JP) .................................. 2013-045672

(51) Int. Cl.
*G06F 3/041* (2006.01)
*G06F 3/044* (2006.01)
(Continued)

(52) U.S. Cl.
CPC .......... *G06F 3/047* (2013.01); *G02F 1/13338* (2013.01); *G06F 3/044* (2013.01);
(Continued)

(58) Field of Classification Search
CPC ........... G06F 3/044; G06F 2203/04112; G06F 3/047; G06F 3/0412; G02F 1/13338
See application file for complete search history.

(56) References Cited

U.S. PATENT DOCUMENTS 4,686,332 A * 8/1987 Greanias ................. G06F 3/044
345/173
4,772,760 A * 9/1988 Graham ................ B64C 1/1476
174/389
(Continued)

FOREIGN PATENT DOCUMENTS

JP    09-511086 A    11/1997
JP    2002-014772 A    1/2002
(Continued)

OTHER PUBLICATIONS

International Search Report issued on May 20, 2014 in PCT/JP2014/001261 field on Mar. 7, 2014.
(Continued)

*Primary Examiner* — Michael J Eurice
(74) *Attorney, Agent, or Firm* — Oblon, McClelland, Maier & Neustadt, L.L.P.

(57) ABSTRACT

Detection column wires and detection row wires are formed by fine wires made of a light-reflective conductive material. The detection column wires are divided into a plurality of column-direction wire bundles each including a predetermined number of detection column wires electrically connected to one another. The detection row wires are divided into a plurality of row-direction wire bundles each including a predetermined number of detection row wires electrically
(Continued)

connected to one another. Reflected light distribution patterns are further provided. The reflected light distribution patterns each include a curved portion that is curved when viewed from a direction perpendicular to a surface of a touch screen, are arranged so that normals to the curved portion are directed towards all directions, and are dispersed so that regions, of curved portions, in which normals are perpendicular to a longitudinal direction of pixels are not aligned with each other in the longitudinal direction of the pixels.

10 Claims, 26 Drawing Sheets

(51) Int. Cl.
   *G06F 3/047* (2006.01)
   *G06F 3/14* (2006.01)
   *G02F 1/1333* (2006.01)
   *G09G 3/00* (2006.01)
(52) U.S. Cl.
   CPC ............ *G06F 3/0412* (2013.01); *G09G 3/00* (2013.01); *G06F 2203/04112* (2013.01); *G09G 2300/0426* (2013.01)

(56) References Cited

U.S. PATENT DOCUMENTS

| | | | |
|---|---|---|---|
| 4,932,755 A * | 6/1990 | Holdridge | H01Q 15/0013 174/389 |
| 5,844,506 A | 12/1998 | Binstead | |
| 5,889,236 A * | 3/1999 | Gillespie | G06F 3/041 178/18.01 |
| 6,137,427 A * | 10/2000 | Binstead | G06F 3/0202 341/33 |
| 7,202,859 B1 | 4/2007 | Speck et al. | |
| RE40,867 E | 8/2009 | Binstead | |
| 8,550,991 B2 | 10/2013 | Nam | |
| 8,599,161 B2 | 12/2013 | Philipp | |
| 8,964,279 B2 | 2/2015 | Melcher et al. | |
| 2004/0229028 A1* | 11/2004 | Sasaki | C03C 17/10 428/220 |
| 2006/0286702 A1* | 12/2006 | Poli | C03C 17/23 438/30 |
| 2007/0074914 A1* | 4/2007 | Geaghan | G06F 3/044 178/18.06 |
| 2007/0264530 A1* | 11/2007 | Takada | H05K 9/009 428/836.1 |
| 2008/0211371 A1* | 9/2008 | Sasaki | H05K 3/106 313/112 |
| 2009/0073085 A1* | 3/2009 | Saneto | H05K 9/0096 345/36 |
| 2009/0219257 A1* | 9/2009 | Frey | G06F 3/044 345/173 |
| 2010/0045615 A1* | 2/2010 | Gray | G06F 3/044 345/173 |
| 2010/0060596 A1* | 3/2010 | Whight | G06F 3/044 345/173 |
| 2010/0060602 A1* | 3/2010 | Agari | G06F 3/044 345/173 |
| 2010/0156840 A1* | 6/2010 | Frey | G06F 3/044 345/174 |
| 2010/0200286 A1* | 8/2010 | Melcher | G02F 1/155 174/261 |
| 2010/0253647 A1* | 10/2010 | Agari | G06F 3/0416 345/174 |
| 2010/0302201 A1* | 12/2010 | Ritter | G06F 3/044 345/174 |
| 2011/0062146 A1 | 3/2011 | Kuriki | |
| 2011/0102361 A1 | 5/2011 | Philipp | |
| 2011/0290631 A1* | 12/2011 | Kuriki | G06F 3/044 200/600 |
| 2012/0056664 A1* | 3/2012 | Nam | G06F 3/044 327/517 |
| 2012/0081324 A1 | 4/2012 | Philipp | |
| 2012/0162116 A1 | 6/2012 | Philipp | |
| 2012/0312677 A1* | 12/2012 | Kuriki | G06F 3/044 200/600 |
| 2014/0293154 A1 | 10/2014 | Philipp | |
| 2015/0002464 A1 | 1/2015 | Nishioka et al. | |

FOREIGN PATENT DOCUMENTS

| | | |
|---|---|---|
| JP | 2010-061502 A | 3/2010 |
| JP | 2010-097536 A | 4/2010 |
| JP | 2012-519897 A | 8/2012 |
| JP | 2012-198740 A | 10/2012 |
| JP | 5054132 B | 10/2012 |
| WO | 95/27334 A1 | 10/1995 |
| WO | 2008/020141 A1 | 2/2008 |
| WO | 2009/139458 A1 | 11/2009 |
| WO | 2013/133026 A1 | 9/2013 |

OTHER PUBLICATIONS

International Preliminary Report on Patentability and Written Opinion issued Sep. 8, 2015 in PCT/JP2014/001261 filed Mar. 7, 2014 (with English language translation).

* cited by examiner

F I G . 8
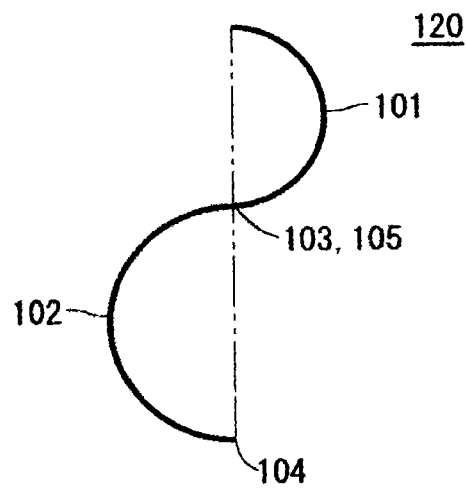
F I G . 9
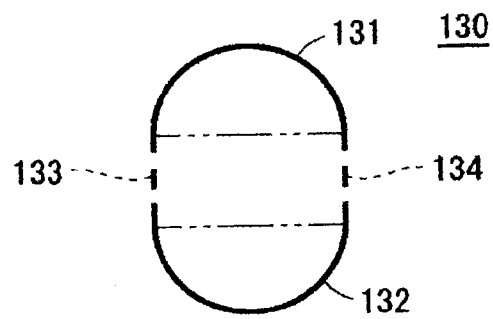
F I G . 1 0
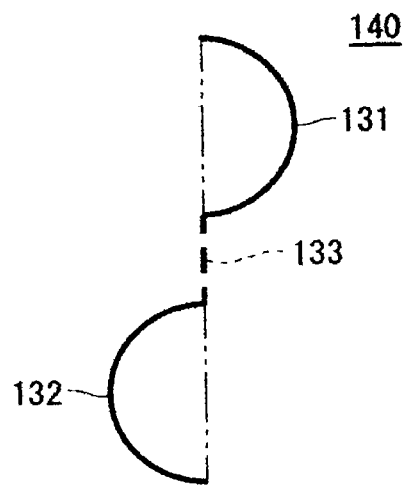

F I G . 1 7
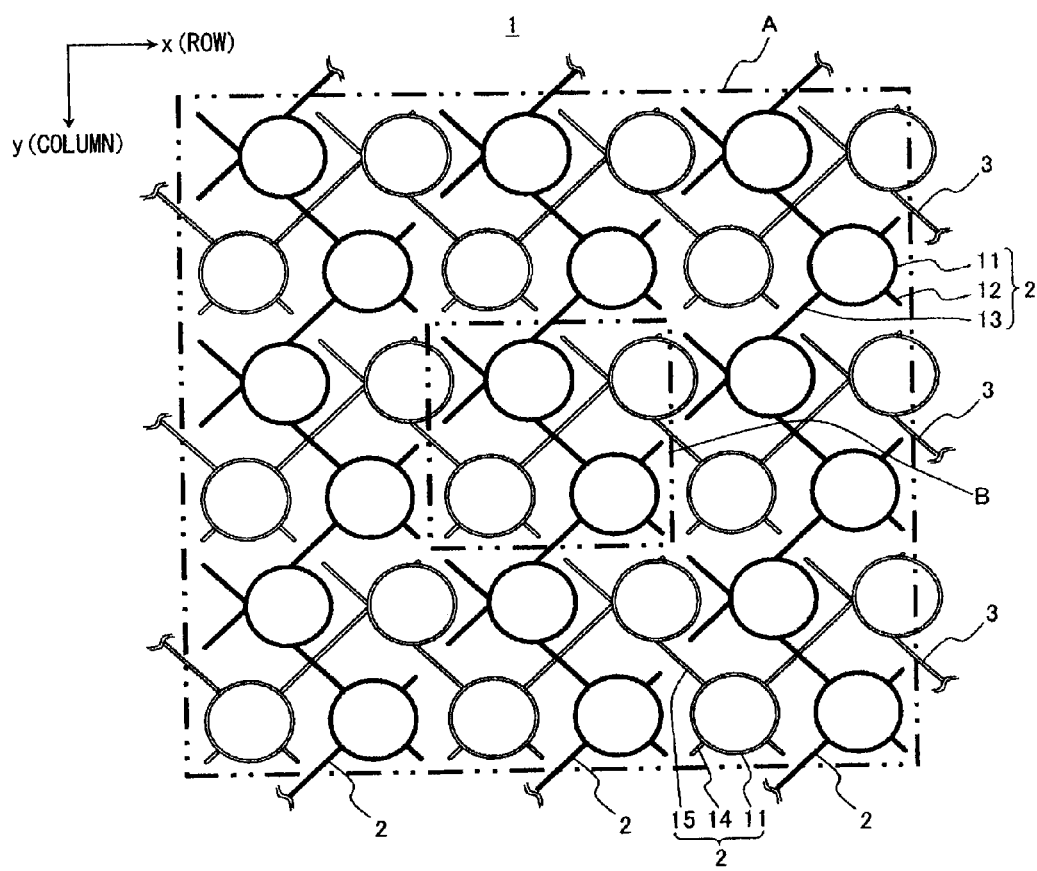

F I G . 2 4
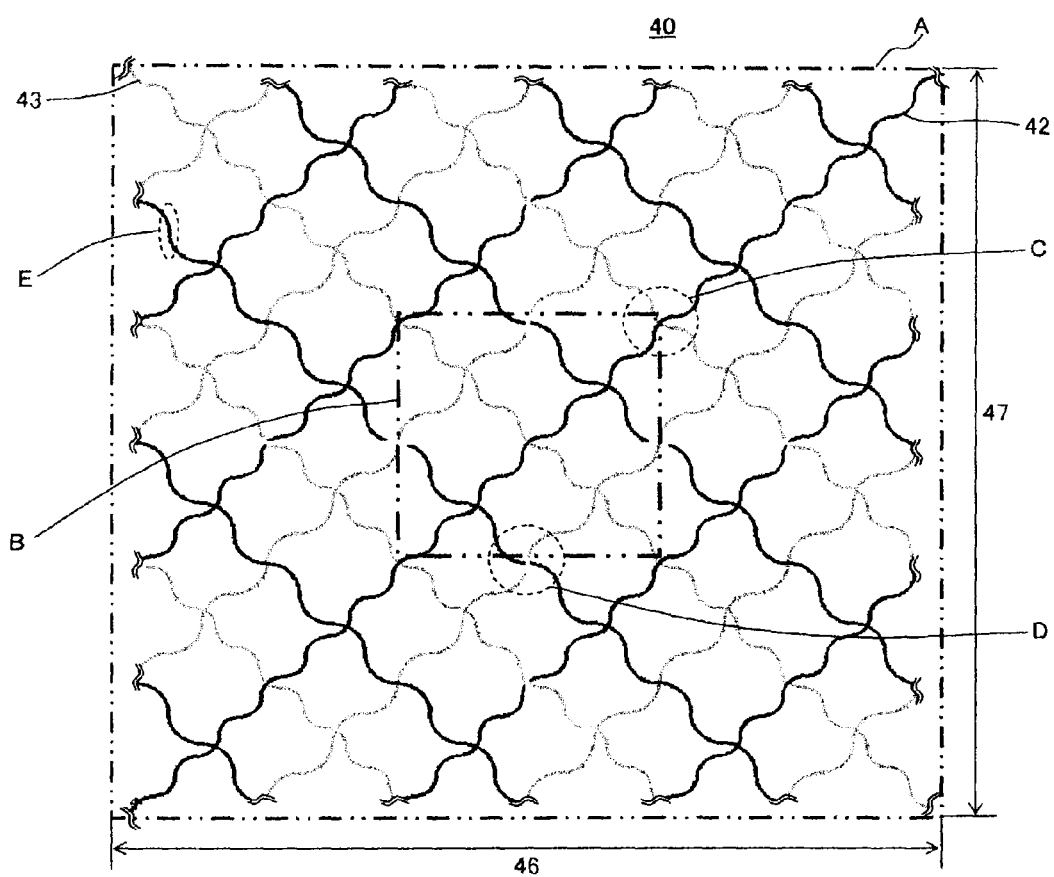

F I G. 2 5
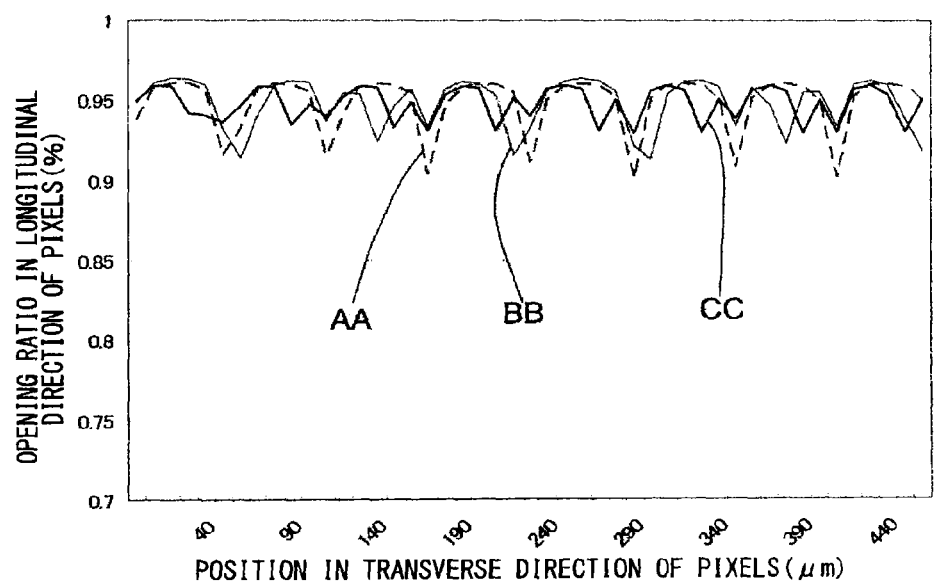

F I G . 3 1
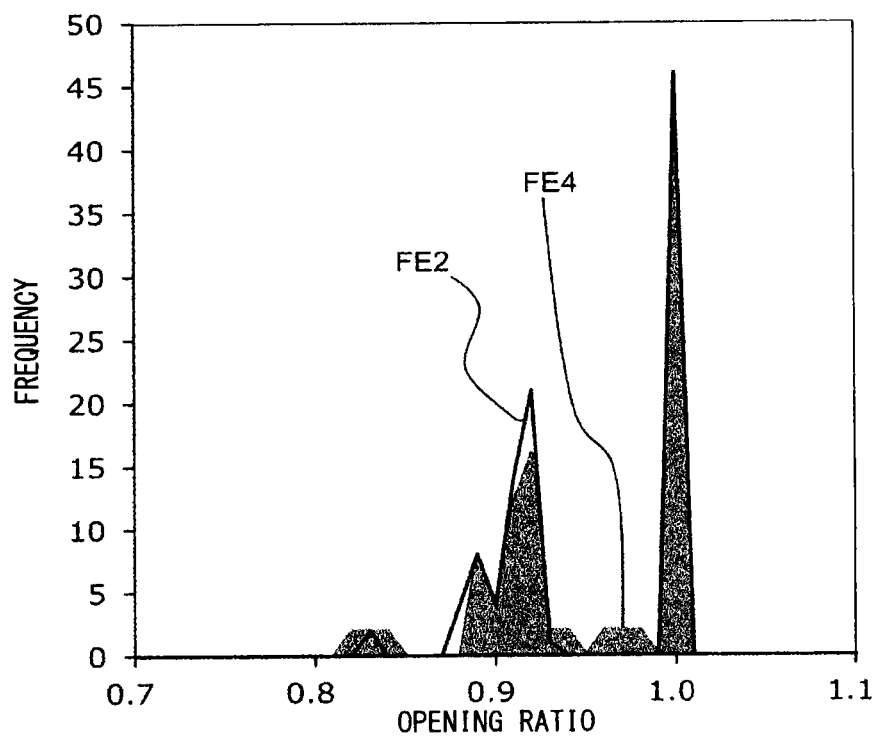

DISPLAY APPARATUS

TECHNICAL FIELD

The present invention relates to a display apparatus including a touch screen.

BACKGROUND ART

A touch panel is widely known as an apparatus for detecting a position (hereinafter, also referred to as a "touch position"), on a touch screen, indicated with an indicator, such as a user's finger and a pen, for output. As a type of detection of a touch position in a touch panel, a plurality of detection types are known. One example of a touch panel of an electrostatic capacitive type is a projected capacitive touch panel.

The projected capacitive touch panel can detect a touch position even when a surface (hereinafter, also referred to as a "front surface"), of a touch screen, facing a user is covered with a protection plate, such as a glass plate, having a thickness of approximately several millimeters. The projected capacitive touch panel has advantages of being robust as the protection plate can be disposed on the front surface, having a long life as there is no movable part, and the like.

The touch screen of the projected capacitive touch panel includes detection column wires for detecting coordinates, of touch positions, in a column direction, and detection row wires for detecting coordinates, of touch positions, in a row direction (see, for example, Patent Document 1). In the following description, the detection column wires and the detection row wires are also collectively referred to as "detection wires".

Patent Document 1 discloses a touchpad system, which corresponds to the touch panel. The touchpad system disclosed in Patent Document 1 includes, as detection wires for detecting electrostatic capacitance (hereinafter, also simply referred to as "capacitance"), a first series of conductor elements formed on a thin dielectric film, and a second series of conductor elements formed above the first series of conductor elements with an insulating film therebetween. There is no electrical contact between the two series of conductor elements, and the first series of conductor elements and the second series of conductor elements overlap each other when viewed from a direction normal to a front surface to form intersection portions without electrical contact.

A detection circuit detects capacitance (hereinafter, also referred to as "touch capacitance") formed between an indicator, such as a finger, and the conductor elements, as the detection wires, to specify coordinates of a touch position indicated with the indicator. Furthermore, through use of relative values of detected capacitance for one or more of the conductor elements, a touch position between conductor elements can be interpolated.

In the following description, a member obtained by arranging detection column wires and detection row wires over a transparent dielectric substrate is referred to as a "touch screen", and an apparatus obtained by connecting a detection circuit to the touch screen is referred to as a "touch panel". A region, on the touch screen, in which a touch position is detectable is referred to as an "operation region".

In order to detect the touch position indicated with an indicator at any positions in the operation region on the touch screen, it is necessary to densely arrange the detection wires in the operation region. In densely arranging the detection wires in the operation region as described above, it is necessary to avoid a problem in that the detection wires are visible to a user.

When the detection wires are formed by a transparent conductive film made, for example, of indium tin oxide (ITO), the possibility that the detection wires are visible to a user is reduced. However, the transparent conductive film made, for example, of ITO has a relatively high electrical resistance (hereinafter, also simply referred to as "resistance"), and thus has a problem in that it is disadvantageous in terms of an increase in size of the touch screen. In addition, the transparent conductive film made, for example, of ITO has a light transmittance (hereinafter, also simply referred to as "transmittance") that is not so high, and thus has a problem in that a relatively large amount of light is necessary when the touch screen is illuminated from a back surface thereof, i.e., from a surface opposite a surface facing a user, by a liquid crystal display (LCD) and the like for use, and it is disadvantageous in terms of reduction of power consumption.

A low-resistance metal material such as silver and aluminum can be used as a material for the detection wires. Use of wires made of the metal material (hereinafter, also referred to as "metal wires") as the detection wires can reduce resistance of the detection wires, but has a problem in that the metal wires are likely to be visible as they are opaque. In order to reduce visibility of the metal wires and to increase transmittance of the touch screen, it is necessary to make the metal wires fine.

When the fine metal wires are used as the detection wires, and densely arranged in the operation region on the touch screen, a problem of a significant increase in parasitic capacitance (hereinafter, also referred to as "line capacitance") between the detection column wires and the detection row wires occurs, causing a harmful effect, such as an increase in wiring delay.

The wiring delay can be mitigated to some extent by reducing wire resistance. Technology for reducing wire resistance to mitigate the wiring delay is disclosed in Patent Document 2, for example.

A touch screen disclosed in Patent Document 2 ensures lower resistance and lower line capacitance by forming detection column wires and detection row wires by linear fine metal wires connected in a zigzag pattern.

In addition, in the touch screen disclosed in Patent Document 2, a plurality of detection row wires approximately extending in a row direction are electrically connected to one another to form a row-direction wire bundle, and a plurality of detection column wires approximately extending in a column direction are electrically connected to one another to form a column-direction wire bundle. This enables uniform detection of touch capacitance including capacitance between an indicator, such as a finger, and the detection row wires, and capacitance between the indicator and the detection column wires.

In the touch screen disclosed in Patent Document 2, however, transmittance locally decreases at portions where fine metal wires are arranged. When the touch screen is used in combination with a display device disposed so as to face a back surface of the touch screen, uneven luminance and uneven display, such as moire, of a display screen occur on a display screen of the display device, and are likely to be viewed as a malfunction by a user. When an illustration is disposed so as to face the back surface of the touch screen to use the touch screen as a digitizer or a tablet, uneven luminance of the illustration occurs, and is likely to be viewed as a malfunction by a user.

Technology for reducing uneven luminance and uneven display (hereinafter, collectively referred to as "uneven display") is disclosed in Patent Document 3, for example. A touch panel disclosed in Patent Document 3 reduces uneven display by providing, in regions enclosed by detection wires in a zigzag pattern, isolated wires not connected to the detection wires.

PRIOR ART DOCUMENTS

Patent Documents

Patent Document 1: Japanese Unexamined Patent Application Publication (Translation of PCT Application) No. 9-511086
Patent Document 2: Japanese Patent Application Laid-Open No. 2010-61502 Patent Document 3: Japanese Patent Application Laid-Open No. 2010-97536

SUMMARY OF INVENTION

Problems to be Solved by the Invention

A touch panel is configured to detect a touch position that a user indicates while viewing a touch screen. The touch screen is sometimes used under illumination with external light so that the touch screen is visible to the user.

In this case, sufficient visibility may not be obtained when metal wires are used as in the technology disclosed in Patent Documents 2 and 3. A metal wire reflects light at a surface thereof even when it is fine, and thus, when the touch screen is used under illumination with external light, the external light is reflected by the metal wire to generate reflected light. Especially when the external light is sunlight or light of an electric bulb, and the touch screen is spot illuminated by such light from a particular direction, intense reflected light is generated.

Since a position of a light source of the external light is often unidentifiable, it is difficult to take any measures to reduce reflected light in accordance with the position of the light source. Therefore, intense reflected light generated through reflection of external light by a metal wire may be visible to a user, and may impair visibility of a display screen or an illumination on the back surface of the touch screen. The technology disclosed in Patent Documents 2 and 3 has room for improvement in terms of visibility.

The present invention aims to provide a display apparatus including a touch screen that has high detection accuracy and display quality, and can achieve high visibility under illumination with external light.

Means for Solving the Problems

A display apparatus according to the present invention is a display apparatus including: a display device having pixels; a touch screen disposed on a display screen side of the display device; and a touch position detection circuit detecting a position, on the touch screen, indicated with an indicator based on electrostatic capacitance formed between the indicator and the touch screen, wherein the touch screen includes: a plurality of column wires extending in a predetermined column direction, and arranged at intervals in a row direction that intersects with the column direction; a plurality of row wires extending in the row direction, and arranged at intervals in the column direction; and a transparent substrate over which the column wires and the row wires are provided so as to intersect with each other in three dimensions while being electrically insulated from each other, the column wires and the row wires are made of a light-reflective conductive material, the column wires are divided into a plurality of column-direction wire bundles each including a predetermined number of column wires electrically connected to one another, the predetermined number being more than one, the row wires are divided into a plurality of row-direction wire bundles each including a predetermined number of row wires electrically connected to one another, the predetermined number being more than one, a plurality of reflected light distribution patterns are provided over the transparent substrate, the reflected light distribution patterns being made of a light-reflective material, the reflected light distribution patterns each include a curved portion that is curved when viewed from a direction perpendicular to a surface, of the transparent substrate, facing a user, and are arranged so that normals to the curved portion are directed towards all directions, and the reflected light distribution patterns are arranged so that parts, of curved portions, parallel to a longitudinal direction of the pixels are not aligned with each other in the longitudinal direction of the pixels.

Effects of the Invention

According to the present invention, with the above-mentioned configuration, the display apparatus that has high display quality and can achieve high visibility under illumination with external light can be achieved.

BRIEF DESCRIPTION OF DRAWINGS

FIG. 8 is a projection showing an example of the reflected light distribution pattern including the curved fine wire that is not closed.
FIG. 9 is a projection showing another example of the reflected light distribution pattern.
FIG. 10 is a projection showing another example of the reflected light distribution pattern.

FIG. 17 is a projection showing a modification of Embodiment 1 of the present invention.

FIG. 24 is a projection showing an example of another wiring pattern in Embodiment 2 of the present invention.

FIG. 25 is a graph showing opening ratio distribution in a longitudinal direction of pixels.

FIG. 31 is a histogram showing opening ratio distribution in Embodiment 4 of the present invention.

DESCRIPTION OF EMBODIMENTS

Embodiment 1

Figure 1:
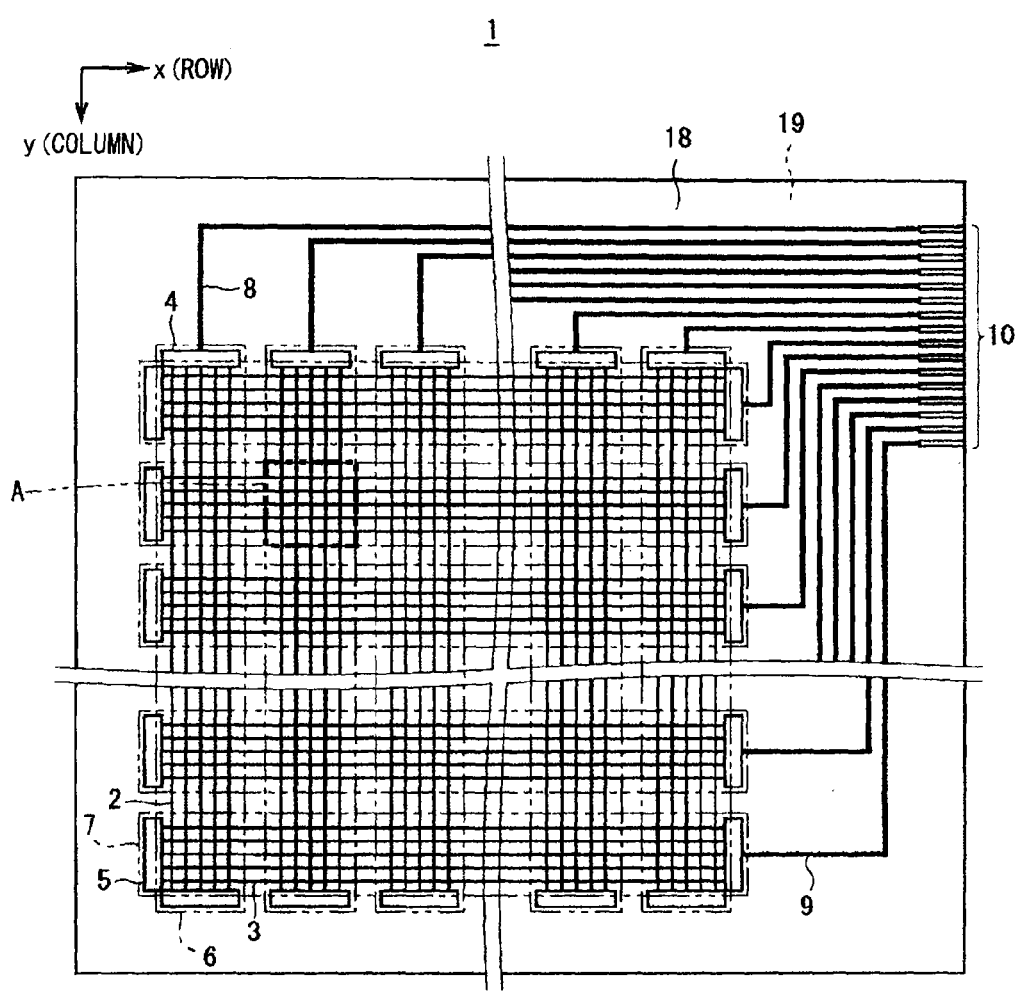
FIG. 1 is a projection showing the configuration of a touch screen 1 in Embodiment 1 of the present invention.
Figure 2:
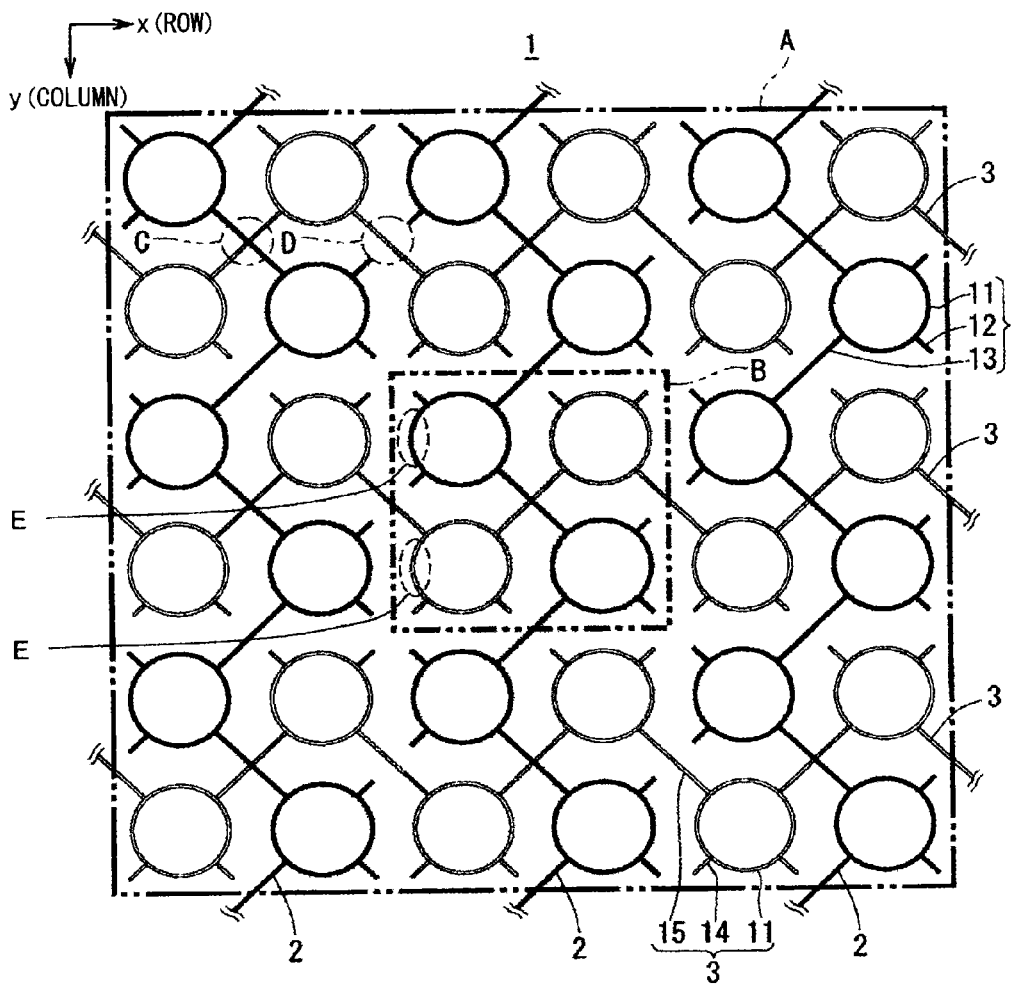
FIG. 2 is a projection showing an enlarged view of a region A in FIG. 1.
Figure 3:
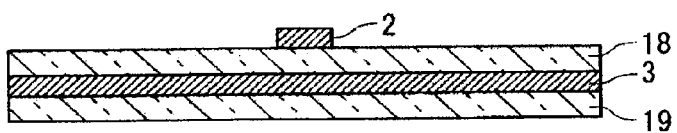
FIG. 3 is a cross section showing the configuration of the touch screen 1 in Embodiment 1 of the present invention.

FIG. 1 is a projection showing the configuration of a touch screen 1 in Embodiment 1 of the present invention. FIG. 1 is a projection viewed from a direction normal to a front surface of a transparent substrate 19. The front surface of the transparent substrate 19 is a surface, of the transparent substrate 19, facing a user, and the direction normal to the front surface of the transparent substrate 19 is a direction perpendicular to the surface, of the transparent substrate 19, facing the user. Hereinafter, the "projection" refers to a projection viewed from this direction, i.e., the direction normal to the front surface of the transparent substrate 19. Considered is a case where a surface, of the transparent substrate 19, over which detection wires 2 and 3 are arranged is planar. In a case where the surface of the transparent substrate 19 is curved, projection onto a planar surface perpendicular to a normal to the surface of the transparent substrate 19 at a given position, i.e., a position at which spot external light enters, is considered. FIG. 2 is a projection showing an enlarged view of a region A in FIG. 1. FIG. 3 is a cross section showing the configuration of the touch screen 1 in Embodiment 1 of the present invention. FIG. 3 shows an enlarged view of a portion where a detection column wire 2 and a detection row wire 3 intersect with each other.

The touch screen 1 in the present embodiment is a projected capacitive touch screen. The touch screen 1 includes a plurality of detection column wires 2 and a plurality of detection row wires 3. The detection column wires 2 and the detection row wires 3 are hereinafter also collectively referred to as "detection wires 2 and 3".

In the present embodiment, the detection column wires 2 and the detection row wires 3 are assumed to be provided over the front surface of the transparent substrate 19 that has a plate-like or film-like shape. FIG. 1 corresponds to a diagram viewed from the direction normal to the front surface of the transparent substrate 19. An insulating layer 18 exists between the detection column wires 2 and the detection row wires 3.

The detection column wires 2 are repeatedly arranged with a predetermined first pitch in a row direction, i.e., in a horizontal direction (x direction) in FIG. 1. The detection row wires 3 are repeatedly arranged with a predetermined second pitch in a column direction, i.e., in a vertical direction (y direction) in FIG. 1. Although the detection wires 2 and 3 are illustrated in lines in FIG. 1 for the sake of clarity, the detection wires 2 and 3 can actually have various shapes.

It is desirable to arrange the detection wires 2 and 3 at intervals of 0.1 mm to 1 mm. If the detection wires 2 and 3 are arranged at short intervals of less than 0.1 mm, transmittance of the touch screen 1 decreases. If the detection wires 2 and 3 are arranged at wide intervals of more than 1 mm, intersection portions of the detection column wires 2 and the detection row wires 3 are also arranged at wide intervals, resulting in reduction of touch position detection accuracy. It is therefore desirable to arrange the detection wires 2 and 3 at intervals of 0.1 mm to 1 mm as described above.

When the detection wires 2 and 3 are arranged at intervals equal to an integral multiple of a pitch of display pixels of a display device, such as a liquid crystal display (LCD), as described later, moire is more likely to occur. Therefore, in a case where a display device disposed or an illustration fixedly shown on the back surface of the touch screen 1 has a periodic structure, it is desirable to arrange the detection wires 2 and 3 at intervals not equal to an integral multiple of a period of the periodic structure.

The detection wires 2 and 3 are made of a light-reflective conductive material. Examples of the light-reflective conductive material are metal such as silver and aluminum, an alloy of such metal, and a material obtained by imparting conductivity to oxide such as ITO. The detection wires 2 and 3 may be formed by paste obtained by dispersing a conductive material in resin, for example, silver paste obtained by dispersing silver in resin.

In the present invention, "light-reflective" means that there is an incident angle of light at which regular reflectance at a portion where a target material is disposed is higher than the reflectance at a portion where the target material is not disposed under the same condition. The "regular reflectance" herein refers to reflectance assessed when an incident angle and a reflection angle of light are equal to each other.

The incident angle and the reflection angle are respectively an angle of incident light and an angle of reflected light in their travelling directions, and are assessed in accordance with the same definition. An angle representing an angle formed by a normal to a surface of a measurement target and a travelling direction of light by an angle of 0° to 90° inclusive is typically used. Reflectance is assessed by luminance reflectance (a value obtained by dividing luminance of light regularly reflected from the measurement target by luminance of light regularly reflected from any standard surface). In light of user's luminosity, spectral reflectance at an appropriate wavelength, for example, spectral reflectance at a wavelength of 555 nm at which luminosity in a bright place is the highest (a value obtained by dividing spectral radiance of light regularly reflected from the measurement target by spectral radiance of light regularly reflected from any standard surface) and spectral reflectance at a wavelength of 507 nm at which luminosity in a dark place is the highest, may be used. Since reflectance is obtained through division by a value with respect to a standard surface, in a case where two types of reflectance are compared to each other, determination can be made based on whether the reflectance is higher or lower than 1 while a surface of the portion where the measurement target is disposed is set to the surface of the measurement target, and a surface of the portion where the measurement target is not disposed is set to the standard surface.

Although the detection wires 2 and 3 are described to be arranged over the front surface of the transparent substrate 19, a protection plate or film made of a transparent dielectric material may further be provided on a side closer to a user, and the detection wires 2 and 3 may be arranged over the back surface of the transparent substrate 19. This is because a projected capacitive touch panel can detect a touch position even when a protection plate and the like exist between a touch screen and a user.

In the present embodiment, the detection column wires 2 are divided into a plurality of column-direction wire bundles 6 each including a predetermined number of detection column wires 2. The predetermined number of detection column wires 2 are electrically connected in common at one end and the other end thereof, i.e., at an upper end and a lower end thereof in FIG. 1, by column connection wires 4 to form a single column-direction wire bundle 6. The predetermined number of detection column wires 2 may be connected only at one end thereof. A state of being "electrically connected" refers to a state of being physically and directly connected by a low-resistance (low-impedance) wire, such as a metal wire described as an example of the wire above. In the present invention, a state of being connected via a detection circuit is not considered as the state of being electrically connected. A state of not being electrically connected is also expressed as a state of being "insulated" or "electrically isolated".

Similarly, the detection row wires 3 are divided into a plurality of row-direction wire bundles 7 each including a predetermined number of detection row wires 3. The predetermined number of detection row wires 3 are electrically connected in common at one end and the other end thereof, i.e., at a left end and a right end thereof in FIG. 1, by row connection wires 5 to form a single row-direction wire bundle 7. The predetermined number of detection row wires 3 may be connected only at one end thereof. The column-direction wire bundles 6 and row-direction wire bundles 7 are hereinafter also collectively referred to as "wire bundles 6 and 7".

By electrically connecting the predetermined number of detection wires 2 and 3 respectively constituting the wire bundles 6 and 7, an effect in that electrical characteristics in each of the wire bundles 6 and 7 are made uniform, and uniform detection of touch capacitance is enabled can be obtained.

This effect can also be obtained by increasing a wiring area, but, in a case where an opaque material, such as metal, or a light-reflective low-transmittance material is used as a material for wires as in the present embodiment, the increase in wiring area reduces transmittance of the touch screen as a wiring portion blocks light or transmittance in the wiring portion decreases. The reduction of transmittance can be suppressed by making wires fine, but, when wires are made as fine as possible to increase transmittance, the possibility that the fine wires are broken increases. Description is made below on the assumption that the material for wires is an opaque material, such as metal.

As described above, in the present embodiment, a plurality of detection wires 2 and 3 are electrically connected to form wire bundles 6 and 7. As a result, a touch position can be detected even if several detection wires 2 and 3 of the wire bundles 6 and 7 are broken. That is to say, formation of the wire bundles 6 and 7 can produce an effect in that an impact of wire breakage, which is a defect caused when the detection wires 2 and 3 are made fine, can be suppressed, and uniform detection of touch capacitance is enabled. In addition, clearances with no wire can be provided between the detection wires 2 and 3 constituting the wire bundles 6 and 7, leading to suppression of reduction of transmittance.

Furthermore, a predetermined number of column-direction wire bundles 6 are arranged in parallel in a row direction x. Similarly, a predetermined number of row-direction wire bundles 7 are arranged in parallel in a column direction y.

Portions where the column-direction wire bundles 6 and the row-direction wire bundles 7 intersect with each other divide the touch screen 1 into a predetermined number of regions. One of the predetermined number of regions is expressed as a rectangle indicated by a reference sign "A" in FIG. 1. The region indicated by the reference sign "A" is hereinafter also referred to as a "region A". The region A corresponds to a unit of detection when a touch position is detected. A touch position between a region A and another region A is obtained through interpolation.

In FIG. 1, the column-direction wire bundles 6 and the row-direction wire bundles 7 are each arranged in a rectangular region, and a touch position is detected in a coordinate system along the row direction x and the column direction y in FIG. 1, but the column-direction wire bundles 6 and the row-direction wire bundles 7 may have other shapes. For example, the column-direction wire bundle 6 and the row-direction wire bundle 7 each may include an arcuate wire bundle and a radial wire bundle extending from the center of the arc. A touch position can be detected in the polar coordinate system by using these wire bundles.

The column-direction wire bundle 6 and the row-direction wire bundle 7 are connected to terminals 10 through lead wires 8 and 9, respectively. Specifically, the column-direction wire bundle 6 is electrically connected to a terminal 10 through a column lead wire 8. The row-direction wire bundle 7 is electrically connected to a terminal 10 through a row lead wire 9.

In FIG. 1, at a portion where a detection column wire 2 and a detection row wire 3 intersect with each other (hereinafter, also referred to as an "intersection portion"), the detection column wire 2 and the detection row wire 3 are electrically insulated from each other with the insulating layer 18 therebetween in three dimensions, as illustrated in FIG. 3. The insulating layer 18 may be provided only at intersection portions of the detection column wires 2 and the detection row wires 3, or may be provided so as to entirely cover the detection row wires 3. The insulating layer 18 is desirably made of a transparent dielectric material containing silicon nitride or silicon oxide, for example. In FIG. 3 described later, the detection column wire 2 and the detection row wire 3 may be switched.

The transparent substrate (hereinafter, also simply referred to as a "substrate") 19 is made of a transparent dielectric material. For example, the substrate 19 may be a stiff member such as a glass substrate, or may be a flexible member such as a resin film. In the present embodiment, the substrate 19 is a rectangular plate-like member. The substrate 19 may have a shape other than a rectangle, and may be curved. In a case where a surface of the transparent substrate 19 is curved, projection onto a planar surface perpendicular to a normal to the surface of the transparent substrate 19 at a given position, i.e., a position at which spot external light enters, is considered.

In the touch screen 1, the column-direction wire bundle 6 and the row-direction wire bundle 7 are included in the region A in FIG. 1, which is a unit of touch position detection. In the present embodiment, as shown in FIG. 2, the column-direction wire bundle 6 includes three detection column wires 2, and the row-direction wire bundle 7 includes three detection row wires 3. The number of detection wires 2 and 3 respectively constituting the wire bundles 6 and 7 may be changed appropriately as long as the number is more than one. Although the detection row wires 3 are indicated in double lines in FIG. 2 for the sake of clarity, the detection row wires 3 are each actually formed by a single fine wire.

In FIG. 2, a portion enclosed by an alternate long and two short dashes line indicated by a reference sign "C" indicates the intersection portion where the detection column wire 2 and the detection row wire 3 intersect with each other with the insulating layer 18 therebetween. A portion enclosed by an alternate long and two short dashes line indicated by a reference sign "D" indicates a portion where the detection column wire 2 is broken (hereinafter, also referred to as a "broken portion"). At the broken portion D, the detection column wire 2 and the detection row wire 3 do not intersect with each other.

A state of intersection of the detection wires 2 and 3 is determined by the intersection portion C and the broken portion D as described above. In the present embodiment, broken fine wires 12 and 14 remain in the detection wires 2 and 3. In addition, linear portions 13 and 15 of the detection wires 2 and 3 extend in a ±45° direction relative to the row direction x or the column direction y. As a result, moire can be less likely to occur in a case where the touch screen 1 is used in combination with a display device having rectangular pixels defined by sides parallel to the row direction x and the column direction y of FIG. 1, a ruled paper such as a graph paper, or a plate surface.

A pattern in which the detection wires 2 and 3 are provided (hereinafter, also referred to as a "wiring pattern") shown in FIG. 2 is one example, and the wiring pattern is not limited to that shown in FIG. 2, and may be any other pattern.

As shown in FIG. 2, the wiring pattern, which is the pattern in which the detection wires 2 and 3 are provided, is formed by repeatedly laying a certain basic pattern in an operation region. This can improve uniformity of touch position detection accuracy in the operation region. The "operation region" herein refers to a region, on the touch screen, in which a touch position is detectable.

In the example shown in FIG. 2, a rectangular region B enclosed by an alternate long and two short dashes line corresponds to the basic pattern. The basic pattern in the rectangular region B is desirable as it can fill a rectangular operation region adopted in many touch panels, and is suitable for detection of a touch position in a Cartesian coordinate system. In a case where a touch position is detected in other coordinate systems, the basic pattern can fill the operation region as a rectangular basic pattern having a size equal to or below the position detection accuracy. A basic pattern in a region having a shape other than a rectangle may be adopted. Regions E indicated by ellipses in dashed lines in the basic pattern in the region B indicate wiring regions each including many components parallel to a longitudinal direction of pixels of a display apparatus equipped with the touch panel of the present invention in a wiring pattern including a curve.

The above-mentioned "wiring regions each including many components parallel to a longitudinal direction of pixels" can also be referred to as "wiring regions each including a portion at which a normal is perpendicular to the longitudinal direction of pixels". The width (a size in a direction perpendicular to the longitudinal direction of pixels) of each of the wiring regions is considered to be equal to a size of a region (a minimum separation threshold) in which a visual angle becomes one minute of arc (an angle equal to 1/60 of one degree) with a visual distance of 300 mm to 500 mm, which is a typical visual distance when the touch screen is used, around the portion at which the normal is perpendicular to the longitudinal direction of pixels. For example, in a case of a curved portion of the wiring pattern shown in FIG. 2, the width of the wiring region is approximately 1/80 to 1/50 of a diameter of a circle formed by a curved fine wire 11.

The basic pattern is not limited to that shown in FIG. 2, and may be various patterns. Basic patterns may be connected by another fine wire, if necessary.

When a fine wire extending in a certain direction is spot illuminated by the sun or an electric bulb, intense reflected light is generated from a surface of the fine wire in the direction in which the fine wire extends. Such reflected light reduces visibility of a display screen or an illustration on the back surface of the touch screen 1, and brings a feeling of discomfort, such as dazzle, to a user.

Especially in a case where a straight line is drawn along an extension direction of a fine wire in a projection, and a fine wire having a break lies on the straight line, the fine wire and the break serve as reflection diffraction grating, and reflected diffracted light is directed towards a direction other than a direction of regular reflection.

Figure 4:
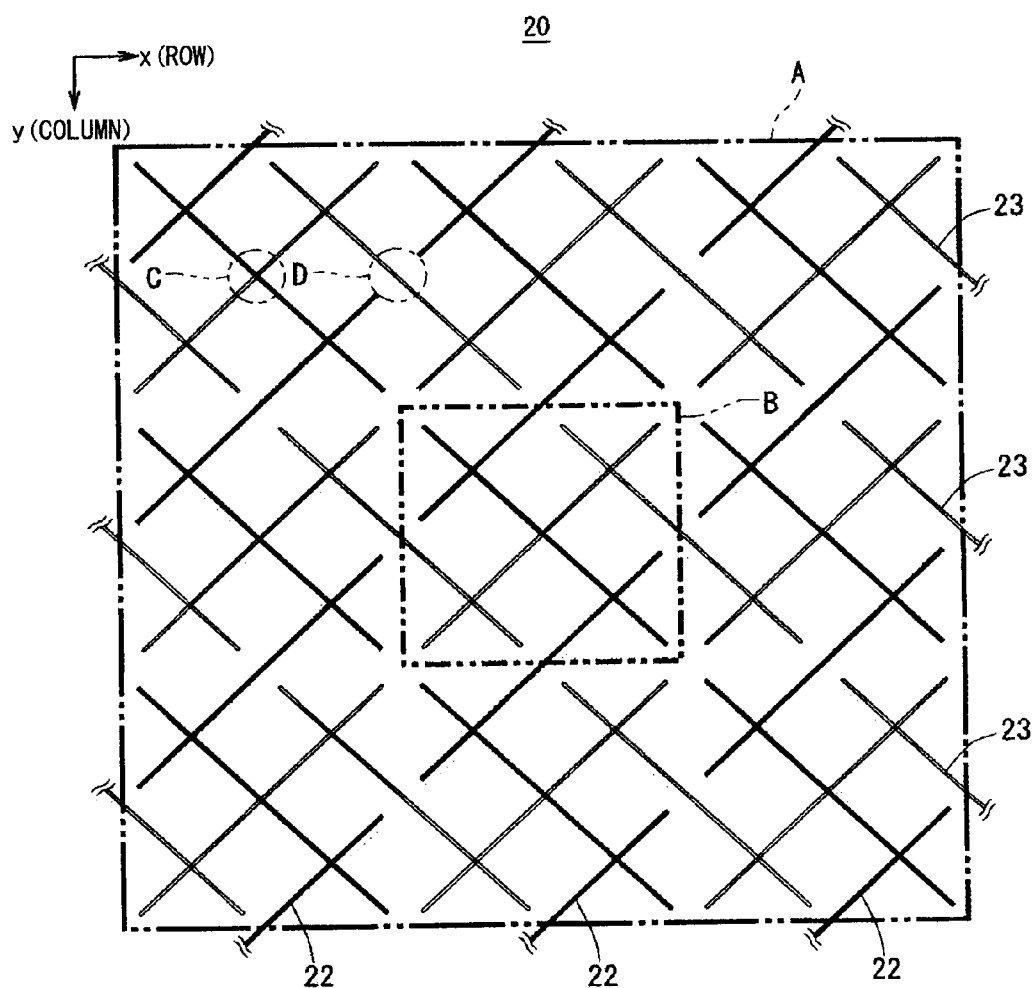
FIG. 4 is a projection showing the configuration of a touch screen 20 having a diagonal cross wiring pattern.

FIG. 4 is a projection showing the configuration of a touch screen 20 having a diagonal cross wiring pattern. For example, in the touch screen 20 shown in FIG. 4, detection column wires 22 and detection row wires 23 are inclined at 45° relative to the row direction x and the column direction y, and extend to form diagonal crosses. When straight lines are drawn in directions of diagonal crosses in the projection of FIG. 4, most of the detection wires 22 and 23 lies on the straight lines drawn in the diagonal cross directions.

When the touch screen 20 is spot illuminated, a spot image is viewed as if it left trails in the diagonal cross directions, which are the extension directions of the detection wires 22 and 23, through a cross filter. This further reduces visibility, and is more likely to bring a feeling of discomfort, such as dazzle, to a user.

In contrast, in the wiring pattern in the present embodiment, the basic pattern in the region B includes linear fine wire portions (hereinafter, also referred to as "linear fine wires") and curved fine wire portions (hereinafter, also referred to as "curved fine wires") as shown in FIG. 2. The curved fine wires correspond to curved portions. In the present embodiment, the curved fine wires 11 are circular fine wires. The curved fine wires 11 are each referred to as a "reflected light distribution pattern". Detailed definition of the reflected light distribution pattern is described later.

When straight lines are drawn from the center of a circle formed by the reflected light distribution pattern 11, a wire lies on a straight line drawn in any direction, and thus reflected light and reflected diffracted light (hereinafter, also collectively referred to as "reflected light") from the reflected light distribution pattern 11 are directed towards all directions. As a result, reflected light in a certain direction as described above can be reduced in the touch screen 1 in the present embodiment, compared to the touch screen 20 provided with a wiring pattern without the reflected light distribution pattern as shown in FIG. 4.

In the following description, a projection viewed from a direction normal to the front surface of the transparent substrate 19 is considered, and lines connected in the projection are considered to be actually connected, unless otherwise indicated. A remark "electrically" is added to express a state of being electrically connected. Wires are considered to be interrupted at end portions of the basic pattern in the region, as it suffices that only the basic pattern in the region B is considered.

The "reflected light distribution pattern" is substantially a fine wire made of a light-reflective conductive material at least partially including a curved fine wire when the detection wires 2 and 3 are viewed in the projection, and normals to the fine wire are directed towards all directions as with the circular fine wire 11 shown in FIG. 2.

In other words, normals obtained at any points on the reflected light distribution pattern 11 are directed towards all directions.

In the present embodiment, the detection wires 2 and 3 including the reflected light distribution patterns 11 as a whole are formed by fine wires. Although the reflected light distribution patterns 11 may not be included in the detection wires, i.e., the reflected light distribution patterns 11 may not be electrically connected to and may be isolated from the detection wires 2 and 3, the reflected light distribution patterns 11 are assumed to be formed by the fine wires as shown in FIG. 2. The following describes terms "width" and "length" as parameters representing characteristics of the shapes of the fine wires.

When viewed in the projection, all lines that form edges of the fine wires are assumed to be referred to as outlines. In a case of a single fine wire having a limited length without any branching (hereinafter, also referred to as a "branch"), i.e., a fine wire whose outlines are two (linear or curved) opposing line segments, a portion corresponding to a region obtained by connecting corresponding ends of the two opposing outlines is considered as a single fine wire (wires including fine wires as shown in FIG. 2 are considered to include a plurality of fine wires). When a fine wire has a branch, the branch is considered as another fine wire. A single fine wire whose two opposing outlines are linear line segments (having a curvature of 0 and an infinite radius of curvature) is defined as a "linear fine wire". A fine wire having the above-mentioned two opposing outlines at least one of which is curved (curvature is not 0) is defined as a "curved fine wire".

Definition of a "fine wire" is described in detail later, but, when a typical longer distance and a typical shorter distance of a wire are respectively set to the "length" and the "width" of the wire, the "fine wire" may substantially be considered as a structure having an extremely smaller width relative to the length. The terms "width" and "length" are specifically in line with the definition described below.

A curved fine wire is considered. When the curved fine wire is viewed in the projection, a point P is set on one of two opposing outlines that has a smaller radius of curvature. An intersection point of a normal nP that is a straight line perpendicular to a tangent to the outline at the point P and the other outline is set to a point Q, and a midpoint between the points P and Q is set to a point R. When there are a plurality of points as candidates for the point Q, a point closest to the point P is set to the point Q. A distance between the points P and Q is defined as the width of the fine wire.

As for the curved fine wire, by moving the point P to every point on the curved outline, distribution of the width and a line segment connecting the midpoints R can be obtained. A discontinuous portion of the line segment connecting the midpoints R (the line segment can be discontinuous in a case where the outline on which the point Q is set is bent, for example) can be connected by an interpolation method using a curve, such as a spline interpolation method, with use of a part of a line on which the point R is set from two end points of the discontinuous portion, so that a continuous line can be obtained. The continuous line is defined as a midline of the curved fine wire. A normal at each point on the midline is defined as a normal at each point on the curved fine wire. A tangential direction at each point on the midline is defined as an extension direction at each point on the curved fine wire. The length of the midline is defined as the length of a curved portion of the curved fine wire. When the midline has end points, in other words, when the midline is not closed, the end points of the midline are defined as end points of the curved fine wire.

In a case of a linear fine wire whose two opposing outlines are both straight lines and which is connected to curved fine wires at both ends thereof, points P are set at two intersection points of outlines of the curved fine wires, to which the linear fine wire is connected at both end thereof, on which points P are set and an outline of the linear fine wire connected to the outlines. Midpoints R at two end points are obtained in accordance with the above-mentioned definition. A straight line connecting the midpoints R at the two end points is defined as a midline of the linear fine wire, a normal to the midline is defined as a normal to the linear fine wire, and a direction of the midline is defined as an extension direction of the linear fine wire. The midpoints R at the two end points are defined as end points of the linear fine wire, which is a part of a fine wire. A distance between the two end points is defined as the length of the linear fine wire. A point R' is set on the midline of the linear fine wire, and intersection points of a normal passing through the point R' and the two outlines are set as points P' and Q'. A distance between the points P' and Q' is defined as the width, and distribution of the width can be obtained by moving the point R' to every point on the midline.

In a case where a curved fine wire is connected to an end of several linear fine wires connected to each other, as for one of the linear fine wires connected to the curved fine wire, a point P is set at an end, opposite the connected end, of an outline of the linear fine wire connected to an outline of a curved portion of the connected fine wire on which a point P is set, and a midline, the width, and the like are obtained in accordance with the above-mentioned procedures. As for another one of the linear fine wires connected to the one of the linear fine wires, a midline, the width, and the like are obtained in accordance with the same procedures by substituting the above-mentioned phrase "connected curved fine wire" with a phrase "connected linear fine wire as for which the point P is set".

Since the reflected light distribution pattern is a fine wire made of a light-reflective conductive material at least partially including a curved fine wire, there is no need to take a fine wire not connected to the curved fine wire into consideration when the reflected light distribution pattern is considered.

When normals to tangents at the points P and Q match each other in a case of a fine wire whose outlines are similar to each other, the midline, the width, the length, and the like obtained in accordance with the above-mentioned procedures match what these terms generally mean. That is to say, a distance between two intersection points of a normal at a point on an outline and outlines is the width, and the width has a constant value at any point on the fine wire, i.e., the fine wire has a constant width. A line connecting midpoints of the two intersection points is the midline, and the length of the midline is the length of the fine wire.

In a case where a branch fine wire extends from a given fine wire, a curve interpolated by an interpolation method, such as the spline interpolation method, from two intersection points of outlines of the given fine wire and the branch fine wire with use of a part of an outline of the fine wire is set to an outline of the given fine wire. The "branch fine wire" herein refers to a fine wire branching from a fine wire to which attention is paid. A desirable interpolation method is an interpolation method in which, at ends of a section as a target for interpolation, an outline to be interpolated is continuous with an original outline outside the section at least up to the second-order derivative. With use of the curved outline, the width, the midline, and the normal of the fine wire are defined in accordance with the same procedures as the above-mentioned procedures as for the portion from which the branch fine wire extends.

In accordance with the above-mentioned procedures, the width, the midline, the normal, and the length of the curved fine wire and the linear fine wire, which are parts of fine wires, can be obtained. If the midline of the fine wire is not closed, end points of the fine wire can be obtained.

A fine wire being the branch fine wire can optionally be selected. Since the aim is to describe the condition about whether a fine wire is a reflected light distribution pattern or not, in a case where a plurality of curved or linear fine wires are connected to each other, below-mentioned determination on whether a curved fine wire is the reflected light distribution pattern or not may be made on the assumption that a fine wire other than any one curved or linear fine wire is a branch fine wire, and the selected one fine wire is connected.

In the above description, whether the fine wire is connected or not is considered in a projection. For example, as with the intersection portion where the detection column wire 2 and the detection row wire 3 intersect with each other with the insulating layer 18 therebetween indicated by the reference sign "C" in FIG. 2, a portion at which fine wires appear to be connected is considered as a portion at which the fine wires are actually connected.

In the present embodiment, as for fine wires included in a basic pattern of wires, any fine wire meeting the following condition is defined as the reflected light distribution pattern. When processing of selecting any one curved fine wire included in a basic pattern of wires, selecting a curved or linear fine wire connected to the selected curved fine wire, if any, and selecting another fine wire further connected to the selected curved or linear fine wire, if any, is repeated (a fine wire connected but not selected is treated as a branch fine wire), and, when normals to the selected fine wires are directed towards all directions, the selected fine wires (or the selected fine wire) are set as candidates for the reflected light distribution pattern. A "direction angle" herein refers to a direction angle in the projection. Candidates are selected in the order of specific cases (a) to (d) described below. In a case where a plurality of candidates can be selected in a higher-order case, a candidate having a minimum sum of the lengths of candidate fine wires is defined as the reflected light distribution pattern. In the case (d), a candidate also having a smaller number of end points is defined as the reflected light distribution pattern. In a case where the number of end points is the same among candidates, a candidate having a minimum sum of distances between end points of candidate fine wires is defined as the reflected light distribution pattern.

By repeating selection of candidates and identification of the reflected light distribution pattern in accordance with the above-mentioned procedures, excluding a fine wire once defined as the reflected light distribution pattern, all reflected light distribution patterns included in the basic pattern of wires can be selected without counting the same fine wire as the reflected light distribution pattern a plurality of times.

Although the projection has been described to be a diagram viewed from a direction normal to the front surface of the transparent substrate 19, i.e., a projection onto a surface perpendicular to the normal, in a case where the above-mentioned condition is met on the projected surface, the above-mentioned condition is met in a projection onto a surface not parallel to the projected surface as long as a new surface is not perpendicular to an original surface. For example, when a circular fine wire is projected onto another surface that is not parallel, the projected circular fine wire becomes elliptical in the projection, but normals are still directed towards all directions. This condition should thus be met in the projection having been described so far, i.e., in a diagram viewed from a direction normal to the front surface, of the transparent substrate 19, facing a user. However, since the front surface of the transparent substrate 19, surfaces of the detection wires 2 and 3, and a surface of a fine wire forming the reflected light distribution pattern are almost parallel in many cases, it is convenient to select a surface parallel to the front surface of the transparent substrate 19 as a projected surface in understanding reflected light. In a case where the transparent substrate 19 is curved by being bent, for example, reflection of light is considered to be similar to reflection of light from a surface parallel to the normal if a radius of curvature is large.

There are the following cases (a) to (d) as the specific cases in which the condition that normals to the selected fine wire are directed towards all directions is met. Determination on whether a fine wire is the reflected light distribution pattern or not is made by examining whether there is any fine wire meeting the case (a), and then examining whether there is any fine wire meeting the cases (b), (c), and (d) in the stated order.

(a) Case where a midline of any selected curved fine wire is curved except for a smoothly-connected straight line (hereinafter, also simply referred to as "the midline is curved"), and is closed as a whole to form a closed curve. In this case, the curved fine wire is the reflected light distribution pattern as normals to the closed curve are directed towards all directions.

For example, the circular fine wire 11 shown in FIG. 2 is the reflected light distribution pattern in accordance with the above-mentioned definition, as a midline of the circular fine wire 11 is arcuate. The reflected light distribution pattern is not limited to a circular fine wire, and may be an elliptical, an oval, or a gourd-shaped fine wire whose midline is a closed curve, for example.

Figure 5:
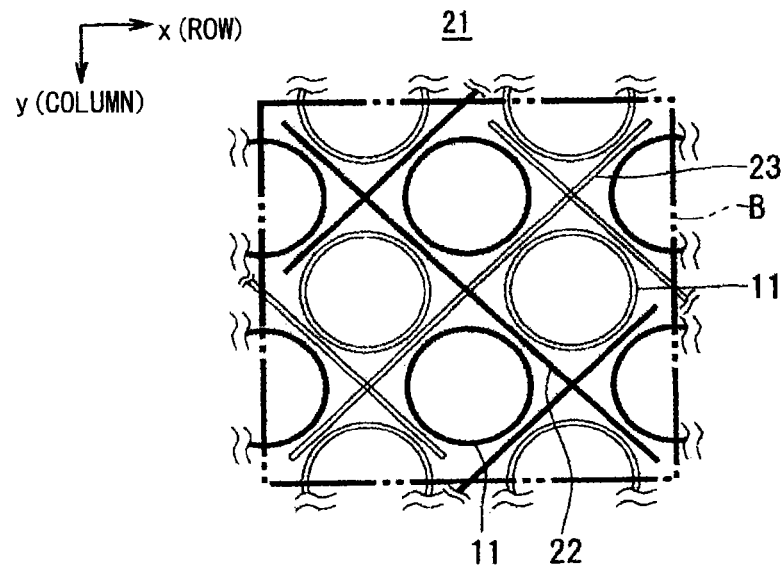
FIG. 5 is a projection showing other examples of reflected light distribution patterns.

FIG. 5 is a projection showing other examples of the reflected light distribution patterns. Although the circular fine wires 11 as the reflected light distribution patterns serve as at least the detection column wires 2 or the detection row wires 3 in FIG. 2, the circular fine wires 11 are electrically insulated from the detection wires 22 and 23 in the wiring pattern in a touch screen 21 shown in FIG. 5. As described above, the reflected light distribution patterns 11 may be electrically insulated from the detection wires 22 and 23. In this case, the reflected light distribution patterns 11 may have branch fine wires.

Figure 6:
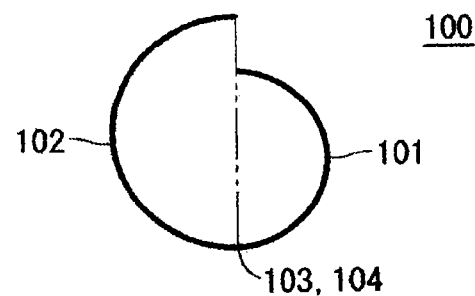
FIG. 6 is a projection showing an example of a reflected light distribution pattern including a curved fine wire that is not closed.
Figure 7:
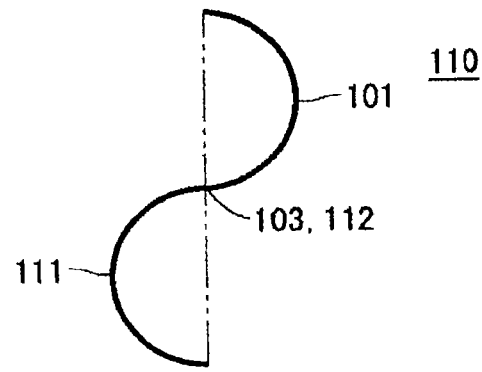
FIG. 7 is a projection showing an example of the reflected light distribution pattern including the curved fine wire that is not closed.

(b) Case where a midline of any selected curved fine wire is curved, and is not closed as a whole, but normals to the curved fine wire are directed towards all directions. FIGS. 6 to 8 are projections showing examples of the reflected light distribution pattern formed by a curved fine wire that is not closed. In FIGS. 6 to 8, a fine wire forming the reflected light distribution pattern is indicated in a bold solid line for the sake of clarity. The examples are shown in FIGS. 6 to 8.

A reflected light distribution pattern 100 shown in FIG. 6 is a fine wire that is not closed and has a figure-of-six shape. The reflected light distribution pattern 100 includes two arcuate (hereinafter, also simply referred to as "semicircular") portions 101 and 102 whose midlines are two semicircles having different radiuses, and which each have concentric outlines and a central angle of 180°. The two portions 101 and 102 are smoothly connected at their ends 103 and 104 so that tangents to outlines are continuous.

A reflected light distribution pattern 110 shown in FIG. 7 is an S-shaped fine wire. The reflected light distribution pattern 110 includes two semicircular portions 101 and 111 having the same radius, and the two semicircular portions 101 and 111 are connected at their ends 103 and 112.

A reflected light distribution pattern 120 shown in FIG. 8 is an S-shaped fine wire. The reflected light distribution pattern 120 includes two semicircular portions 101 and 102 having different radiuses, and the two semicircular portions 101 and 102 are connected at their ends 103 and 105.

A pattern obtained by repeatedly arranging each of the reflected light distribution patterns 100 and 120 respectively shown in FIGS. 6 and 8 is horizontally asymmetric, and thus, in a case of using each of the reflected light distribution patterns 100 and 120, it is desirable to include a fine wire obtained through horizontal flip of each of the reflected light distribution patterns 100 and 120 in the basic pattern of wires in the region B.

The reflected light distribution patterns 100, 110, and 120 shown in FIGS. 6 to 8 may be used while being electrically connected to or isolated from at least the detection column wires 2 or the detection row wires 3. The reflected light distribution patterns 100, 110, and 120 shown in FIGS. 6 to 8 may have branch fine wires.

The reflected light distribution pattern selected in the above-mentioned case (b) may have another shape. For example, in the reflected light distribution patterns 100, 110, and 120 shown in FIGS. 6 to 8, the semicircular fine wires 101, 102, and 111 may be replaced by semi-elliptical or semi-oval fine wires. The shape of the reflected light distribution pattern is not limited to these shapes, and a fine wire functions as the reflected light distribution pattern as long as normals thereto are directed towards all directions even if a midline of the fine wire is not closed.

(c) Case where any selected curved fine wire is connected to another curved fine wire via a linear fine wire, and normals to the connected curved fine wires as a whole are directed towards all directions. In this case, the connected curved fine wires as well as the linear fine wire via which the curved fine wires are connected constitute the reflected light distribution pattern.

Figure 11:
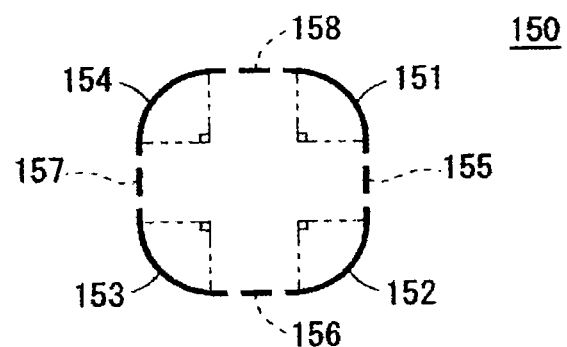
FIG. 11 is a projection showing another example of the reflected light distribution pattern.

FIGS. 9 to 11 are projections showing other examples of the reflected light distribution pattern. In FIGS. 9 to 11, from among fine wires constituting the reflected light distribution pattern, curved fine wires are indicated in bold solid lines, and linear fine wires are indicated in bold dashed lines for the sake of clarity.

A reflected light distribution pattern 130 shown in FIG. 9 has a track shape. The reflected light distribution pattern 130 includes two semicircular fine wires 131 and 132 having the same radius, and two short linear fine wires 133 and 134 having the same length and connecting the semicircular fine wires 131 and 132. A reflected light distribution pattern 140 shown in FIG. 10 has a hook-like shape. The reflected light distribution pattern 140 includes two semicircular fine wires 131 and 132 having the same radius, and one short linear fine wire 133 connecting the semicircular fine wires 131 and 132.

A reflected light distribution pattern 150 shown in FIG. 11 has a rounded square shape. The reflected light distribution pattern 150 includes four arcuate (hereinafter, referred to as a "90° arcuate") fine wires 151 to 154 whose midlines are arcs each having a central angle of 90°, and which each have concentric outlines and a central angle of 90°, and four short linear fine wires 155 to 158 having the same length and connecting the four arcuate fine wires 151 to 154. In the following description, an arcuate fine wire whose midline is an arc having a central angle of θ°, and which has concentric outlines and a central angle of θ° is also referred to as a "θ° arcuate" fine wire. Herein, θ° represents an angle greater than 0° and smaller than 360° (0°<θ<360°).

The reflected light distribution patterns 130, 140, and 150 shown in FIGS. 9 to 11 may be used while being electrically connected to or isolated from other fine wires, for example, at least the detection column wires 2 or the detection row wires 3. The reflected light distribution patterns 130, 140, and 150 shown in FIGS. 9 to 11 may have branch fine wires.

The reflected light distribution pattern selected in the above-mentioned case (c) may have another shape. For example, in the reflected light distribution patterns 130 and 140 respectively shown in FIGS. 9 and 10, the semicircular fine wires 131 and 132 may be replaced by semi-elliptical or semi-oval fine wires. The reflected light distribution pattern may have a shape of a symbol "∞" representing infinity by including two arcuate fine wires and crossed linear fine wires connecting the two arcuate fine wires, or may have a shape of a rounded polygon other than a square. The shape of the reflected light distribution pattern is not limited to these shapes, and any fine wire functions as the reflected light distribution pattern as long as the fine wire includes a plurality of curved fine wires connected to each other via a linear fine wire, and normals to the curved fine wires as a whole are directed towards all directions.

(d) Case where, in a basic pattern of wires, for example, in the region B, normals to a plurality of isolated curved fine wires as a whole are directed towards all directions. Some of the isolated curved fine wires may be connected via a linear fine wire. When there is a plurality of methods for selecting a fine wire, a method in which the number of end points of the selected fine wire is smaller is given a higher priority.

When the number of end points is the same between methods, a method in which a distance between end points is shorter is given a higher priority. Processing of selecting a pair of end points with the shortest distance, and then selecting, while excluding the selected pair, another pair of end points with the shortest distance is repeated. The sum of distances in the selected pairs of end points is set to the sum of distances between end points.

Figure 12:
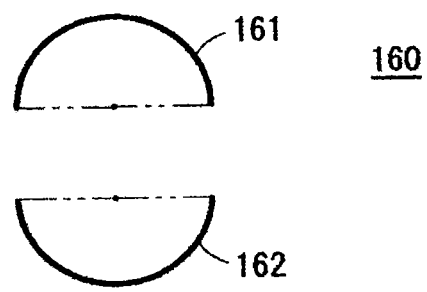
FIG. 12 is a projection showing another example of the reflected light distribution pattern.
Figure 13:
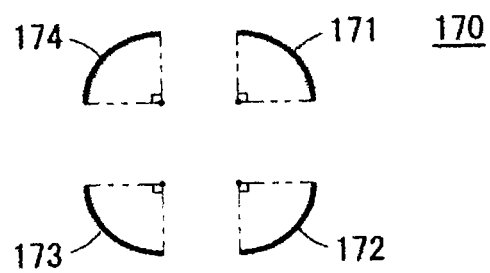
FIG. 13 is a projection showing another example of the reflected light distribution pattern.

FIGS. 12 and 13 are projections showing other examples of the reflected light distribution pattern. In FIGS. 12 and 13, fine wires constituting the reflected light distribution pattern are indicated in bold solid lines for the sake of clarity.

A reflected light distribution pattern 160 shown in FIG. 12 includes two semicircular fine wires 161 and 162 that are circular if combined.

A reflected light distribution pattern 170 shown in FIG. 13 includes four 90° arcuate fine wires 171 to 174 that are circular if combined.

At least one of the curved fine wires 161 and 162 constituting the reflected light distribution pattern 160 shown in FIG. 12 and at least one of the curved fine wires 171 to 174 constituting the reflected light distribution pattern 170 shown in FIG. 13 should be isolated without being electrically connected to other fine wires, such as the detection wires 2 and 3, and the other curved fine wires may electrically be connected to other fine wires. The curved fine wires 161 and 162 constituting the reflected light distribution pattern 160 shown in FIG. 12 and the curved fine wires 171 to 174 constituting the reflected light distribution pattern 170 may have branch fine wires.

The reflected light distribution pattern selected in the above-mentioned case (d) may have another shape. For example, n arcuate fine wires having central angles of $g_1$, $g_2, \ldots, g_n$ (unit: "°") whose sum is equal to or greater than 360° ($g_1+g_2+ \ldots +g_n \geq 360°$) may be arranged so as to be a circular fine wire if combined. The shape of the reflected light distribution pattern is not limited to these shapes, and any fine wire functions as the reflected light distribution pattern as long as normals to a plurality of curved fine wires constituting the fine wire as a whole are directed towards all directions.

When the above-mentioned procedures for selecting the reflected light distribution pattern are applied to wires included in the region B in FIG. 2, four circular fine wires are selected as the reflected light distribution patterns in the case (a), and remaining linear fine wires are determined to be fine wires that cannot form the reflected light distribution pattern.

As described above, when a fine wire extending in a certain direction is spot illuminated by external light, such as sun light and light of an electric bulb, intense reflected light is generated from a surface of the fine wire in an extension direction of the fine wire. The reflected light brings a feeling of discomfort, such as dazzle, to a user. Especially in a case where the fine wire extending in the certain direction has a break when viewed in a projection, the fine wire serves as reflection diffraction grating, and reflected light is directed towards a direction other than a direction of regular reflection, as the wiring pattern is repetition of a basic pattern. For example, when fine wires extend so as to form a cross, cross reflected light is viewed by a user as if it passed through a cross filter. This further reduces visibility, and brings a feeling of discomfort.

The function that the reflected light distribution pattern is required to have is to prevent such intense reflected light from being generated only in a certain direction, in other words, to make reflected light inconspicuous when a touch screen is viewed. A condition required for a fine wire forming the reflected light distribution pattern is a condition that an area as a value obtained by integrating, along midlines, the widths of one or more curved fine wires determined to form the reflected light distribution pattern in accordance with the above-mentioned definition in the basic pattern of wires is larger than an area of a linear fine wire included in the basic pattern of wires, although this is a qualitative condition. This condition is a condition that a fine wire forming the reflected light distribution pattern at least has to satisfy.

That is to say, a curved fine wire determined to form the reflected light distribution pattern in accordance with the above-mentioned condition and any linear fine wire connected to the curved fine wire are candidates for the reflected light distribution pattern. In order for these fine wires to actually function as the reflected light distribution pattern, the above-mentioned condition regarding the area has to be satisfied.

The length of a linear fine wire included in a fine wire forming the reflected light distribution pattern is preferably as short as possible, but a short linear fine wire can be used in view of uneven luminance and uneven display, such as moire, of an image or an illustration on the back surface of the touch screen, and electrical characteristics such as wiring resistance.

A reflected light distribution pattern having the smallest area enclosed by a midline and having the shortest length is a circular fine wire. Therefore, a reasonable condition required for a fine wire having the shortest length in the present invention is a condition that, when a fine wire B having the same length as that of a given target fine wire A, having the same width as a maximum width of the fine wire A, and having a constant width is rounded to form a circular fine wire, the fine wire B does not have a disk shape with no fine wire at its center, i.e., the fine wire B has a shape of a circle drawn in a line.

Assume that the fine wire B has the same length as that of the given fine wire A, has concentric outlines, and has the same width as the maximum width of the fine wire A. Assume that the width and the length are obtained in accordance with the same definition as the definition applied to fine wires in the present invention. When a radius of a midline and the width of the fine wire B are respectively represented by "r" and "2a", an aspect ratio, which is a ratio of the length l ($l=2\pi r$) to the width, of the fine wire B should satisfy $l/2a=2\pi r/2a=\pi r/a > \pi$, as the above-mentioned condition is satisfied if $r>a$ ($r/a>1$) is satisfied. As for the given fine wire A, if the aspect ratio, which is a ratio of the length to the maximum width, is equal to or higher than $\pi$, the fine wire A has a shape with no fine wire at its center, and a midline and a normal can be determined in accordance with the definition applied to fine wires in the present invention even if the fine wire A is circular. Determination on whether the fine wire A is the reflected light distribution pattern or not can thus be made, and the condition regarding the aspect ratio is a reasonable condition required for the fine wire having the shortest length in the present invention. Although the definition of a fine wire has not clearly been described so far, a member having an aspect ratio, i.e., the length/the maximum width, of $\pi$ or higher when viewed in a projection is defined as a "fine wire", and wires formed by such fine wires are defined as "wires made fine". Herein, it represents a circular constant.

When not fine wires but block-like wires each having a low aspect ratio are arranged at close intervals on a circle, for example, or a plurality of sets of the arranged block-like wires are arranged so that intervals therebetween do not overlap each other to form a pattern like a dart target, the resulting pattern appears to be equivalent to the reflected light distribution pattern.

Even when the resulting pattern appears to be equivalent to the reflected light distribution pattern, the pattern functions as diffraction grating if intervals therebetween overlap each other, and reflected light is directed towards a direction other than a direction of regular reflection, leading to impairment of visibility. In this case, efficiency of high-angle side diffraction is high as wires are arranged at close intervals, and this is not preferable.

Reflection of diffracted light from a fine wire is considered. For the sake of simplicity, assume that monochromatic light that can be approximated by a plane wave enters from a direction normal to the front surface of the transparent substrate 19. A repetition period of the basic pattern of the detection wires 2 and 3 is set so as to satisfy the touch position detection accuracy, which is usually accuracy of a position indicated with a finger or a pen and is of approximately several millimeters or smaller, and is small enough to approximate light diffraction as Fraunhofer diffraction, compared to a distance between a touch screen and a user who views the touch screen (approximately 10 cm or longer). A diffraction pattern of light that enters perpendicularly can be approximated by the square (intensity) of the magnitude of the Fourier transform of the wiring pattern. This approximation is strictly established in a case where distances between surfaces of fine wires and the front surface of the touch screen are uniform, and reflected light is not generated from a portion with no wire, but, even in a case other than the above-mentioned case, this approximation is enough to simply make a qualitative discussion.

Figure 14B:
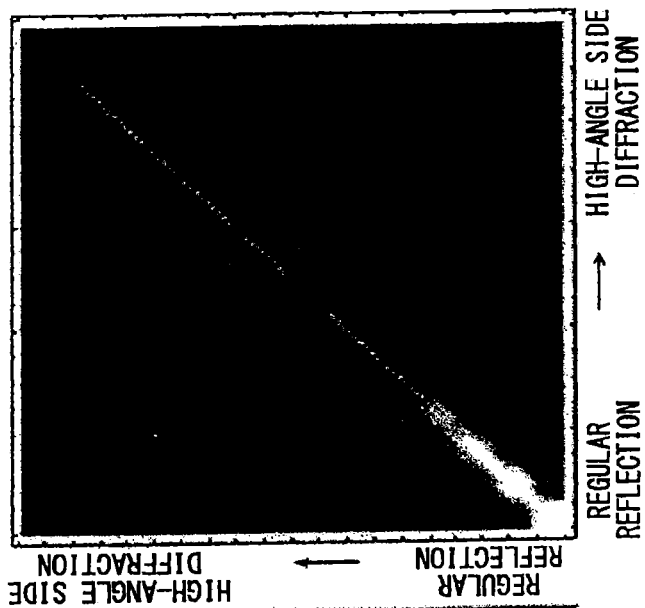
FIGS. 14A, 14B show an example of a basic pattern of wires and the vicinity of a DC component of the Fourier transform of the basic pattern.
Figure 14A:
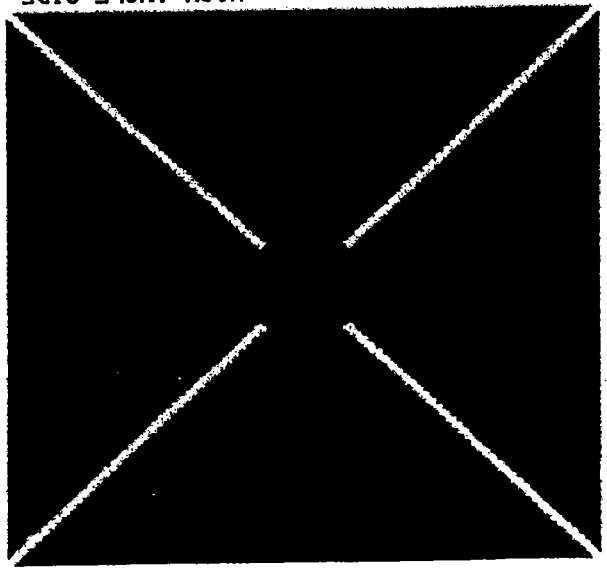

FIGS. 14A, 14B show an example of the basic pattern of wires and the vicinity of a DC component of the Fourier transform of the basic pattern. Electrical connection between wires is ignored in FIG. 14 so that the above-mentioned approximation is established, and a behavior of reflected diffracted light is facilitated. FIG. 14A is a diagram showing an example of a simplified basic pattern of wires, and FIG. 14B is an enlarged view of the vicinity of a DC component of the Fourier transform of the basic pattern of FIG. 14A. In FIG. 14A, a white portion represents a portion where there is a fine wire, and a black portion represents a portion where there is no fine wire.

FIG. 14B is the Fourier transform diagram showing light distribution of reflected diffracted light when monochromatic light that can be approximated by a plane wave enters from a direction normal to the front surface of the transparent substrate 19 in a state where the basic pattern of FIG. 14A is repeated to fill the front surface of the transparent substrate 19, which is planar. In the Fourier transform diagram of FIG. 14B, a white portion represents a portion where reflected light is intense, and a black portion represents a portion where reflected light is weak. FIG. 14B is specifically a grayscale in which an intensity of 0 is represented in black, and a maximum intensity excluding the highest intensity of 1% (a quantile of 99/100, the highest intensity of 1 percent point) is represented in white.

The bottom left corner (origin) of the Fourier transform diagram of FIG. 14B corresponds to regular reflection, and vertical and horizontal axes in the Fourier transform diagram of FIG. 14B represent diffraction angles, and are proportional to the inverse of a wavelength. It is therefore indicated that diffracted light is reflected to the right in a horizontal axis right direction, upwards in a vertical axis upper direction, and upwards to the right between the horizontal and vertical axes (an inner portion of the diagram) with a larger diffraction angle with increasing distance from the origin. Due to symmetry of the basic pattern, directions other than the upper right direction are rotationally symmetrical around the bottom left corner of the Fourier transform diagram of FIG. 14B.

The Fourier transform diagram of FIG. 14B corresponds to a diagram in a case where monochromatic (short-wavelength) light approximated by a plane wave enters. If the wavelength of light changes, the vertical and horizontal axes of the Fourier transform diagram of FIG. 14B change by a factor of the changed amount. Therefore, the diffraction angle changes, but the diffraction direction does not change. It can be understood from FIG. 14B that the diffracted light is reflected in a 45° direction, but is interrupted, and there is a diffraction angle at which the diffracted light is not reflected even in the 45° direction at illumination with the monochromatic light. However, when light having different wavelengths enters simultaneously, for example, at illumination with white light, the light is also diffracted in the 45° direction, but rainbow-like color change can be observed in the 45° direction as the diffraction angle at which the light is not diffracted varies among the wavelengths.

FIG. 14A illustrates a diagonal 45° linear basic pattern having a break, and intense diffracted light is reflected in the 45° direction, which is an extension direction of fine wires. If the paper surface is filled with the basic pattern of FIG. 14A, a portion where there is a fine wire and a portion where there is no fine wire periodically appear on a straight line having a certain inclination. That is to say, since fine wires periodically exist in any directions, diffracted light is generated in any directions in principle, but intense reflected diffracted light is generated in the extension direction of fine wires.

Figure 15B:
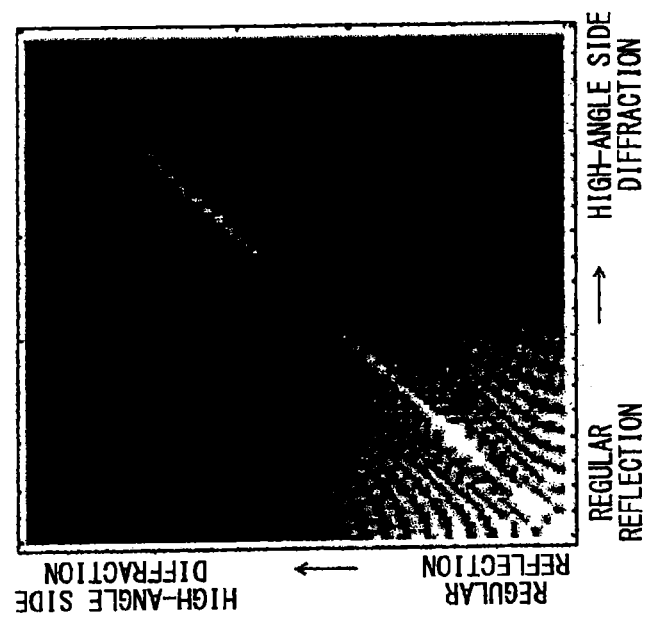
FIGS. 15A, 15B show an example of the basic pattern of wires and the vicinity of the DC component of the Fourier transform of the basic pattern.
Figure 15A:
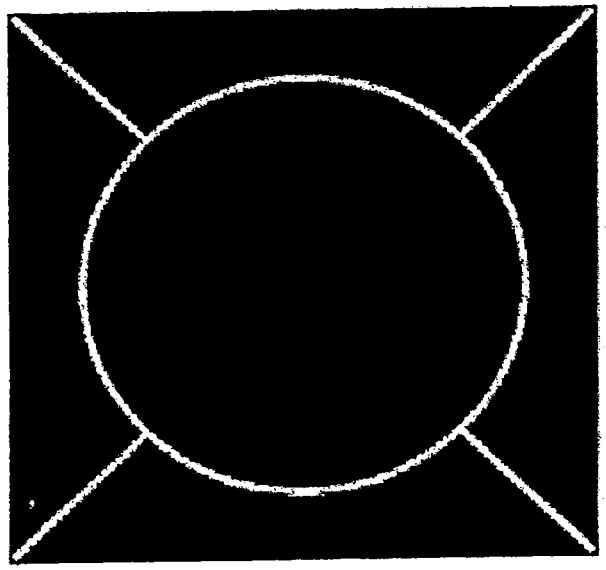

FIGS. 15A, 15B show an example of the basic pattern of wires and the vicinity of a DC component of the Fourier transform of the basic pattern. FIG. 15A is a diagram showing an example of a simplified basic pattern of wires, and FIG. 15B is an enlarged view of the vicinity of a DC component of the Fourier transform of the basic pattern of FIG. 15A. In FIG. 15A, a white portion represents a portion where there is a fine wire, and a black portion represents a portion where there is no fine wire. FIGS. 15A, 15B illustrate a basic pattern in which linear fine wires are connected to a circular fine wire as a reflected light distribution block as shown in FIG. 2, and diffracted light is reflected from a linear fine wire portion in the 45° direction, but occurrence of intense light in a particular direction is reduced and visibility is improved as diffracted light from a circular fine wire portion are reflected in other directions.

Specifically, although the Fourier transform diagram of FIG. 15B has a shape of the ribs of a round fan, reflected diffracted light is actually generated in all directions. The reflected diffracted light appears to be generated in directions normal to the circular fine wire. The light is actually generated in the extension direction of the fine wire, but the extension direction of the fine wire is a direction of a tangent to a midline of the fine wire, and is perpendicular to the direction normal to the fine wire. Therefore, when normals to the fine wire are directed towards all directions, which is the condition required for the reflected light distribution pattern, the extension direction is also directed towards all directions. There is no problem with determination of the condition required for the reflected light distribution pattern based on the normal direction. In the present invention, the reflected light distribution pattern is defined in the normal direction based on impression of the appearance of the reflected diffracted light from the circular fine wire. The normal direction can be substituted with the extension direction, if necessary.

It can be understood from FIG. 15B that, when reflected light having a small diffraction angle similar to that in regular reflection is directed towards all directions, i.e., when an image on a touch screen is viewed in regular reflection in a case where the touch screen is spot illuminated, a boundary of the image looks blurred, that is to say, an effect similar to an effect obtained through anti-glare processing is obtained.

A phenomenon that the Fourier transform diagram of FIG. 15B has a shape of the ribs of a round fan is an apparent phenomenon occurring due to the fact that a calculation unit cell and a calculation region at calculation of the Fourier transform have finite sizes. For example, when the calculation unit cell is assumed to have a size of 1 mm square, and the calculation region is assumed to have a size of 10 mm square, a minimum period that can be expressed is a period of 2 mm in a vertical or horizontal direction (repetition of white and black per 1 mm), and a maximum period is a period of 10 mm in the vertical or horizontal direction (repetition of white and black per 5 mm). When a direction that is slightly shifted from the horizontal direction is considered, a direction of a periodic structure including repetition of white and black per 5 mm in the horizontal (0°) direction and repetition of white and black per 1 mm in an upper (90°) direction is expressed as $\tan^{-1}(2/10)=11.3°$, and a direction between the horizontal direction (0°) and the 11.3° direction cannot be expressed.

Figure 16B:
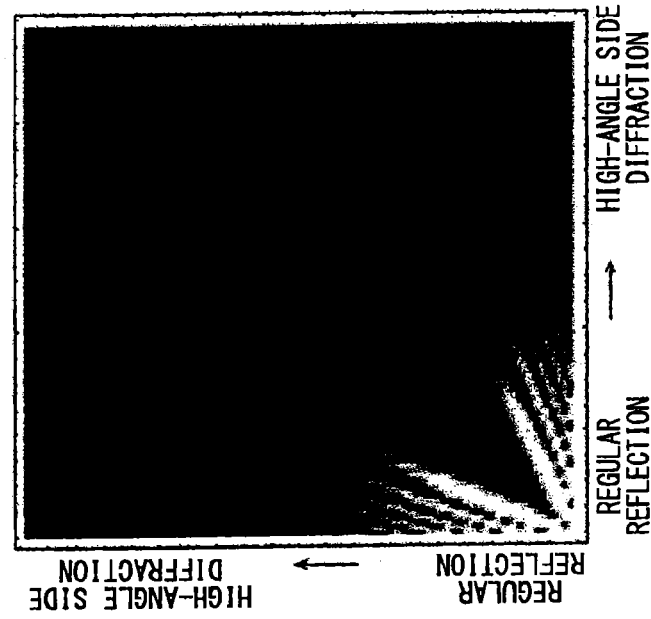
FIGS. 16A, 16B show an example of the basic pattern of wires and the vicinity of the DC component of the Fourier transform of the basic pattern.
Figure 16A:
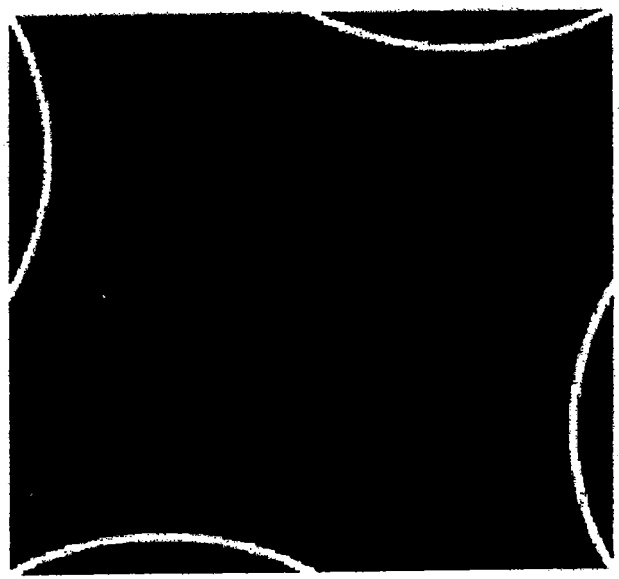

FIGS. 16A, 16B show an example of the basic pattern of wires and the vicinity of a DC component of the Fourier transform of the basic pattern. FIG. 16A is a diagram showing an example of a simplified basic pattern of wires, and FIG. 16B is an enlarged view of the vicinity of a DC component of the Fourier transform of the basic pattern of FIG. 16A. In FIG. 16A, a white portion represents a portion where there is a fine wire, and a black portion represents a portion where there is no fine wire.

FIGS. 16A, 16B illustrate a basic pattern including 60° arcuate fine wires, in which an arcuate fine wire curving out to the left in a lower right side and an arcuate fine wire of an adjacent basic pattern (not illustrated) curving out to the right in an upper left side are connected so as to approximately extend in the vertical direction. Similarly, arcuate fine wires in upper and lower sides approximately extend in the horizontal direction. Since there is no reflected light distribution pattern, diffracted light is not reflected in a range of 45°±15° (having a width of 30°). As such, when a fine wire is absent in a direction normal to the fine wire in a certain angular range (when there is no fine wire having a normal in the angular range), diffracted light is not reflected in the direction.

As described above, reflected light is directed towards all directions when normals to the fine wire are directed towards all directions, and thus this is set to the condition required for the reflected light distribution pattern. That is to say, it is the most desirable that the normals be strictly directed towards all directions as with a circular fine wire, but the normals do not necessarily have to be directed towards all directions. It suffices in practical use that reflected light from one point on a touch screen surely enters into one of the left and right eyes of a user, as the user does not suddenly sense the presence or absence of reflected light. Since a distance between the human eyes is approximately 6.5 cm, conditions obtained for visual distances of 20 cm (e.g., in a case of operating a mobile terminal in front of the eyes with a finger), 50 cm (e.g., in a case of operating a ticket vending machine with the elbow stretched to some extent), and 80 cm (e.g., in a case of operating a digitizer on a disk with a pen) are approximately 16.7°, 6.8°, and 4.3°, respectively.

Although it is the most desirable that normals to a fine wire be directed towards all directions in order for the fine wire to function as the reflected light distribution pattern, a fine wire sufficiently functions as the reflected light distribution pattern in practical use if an allowable angular range in which diffracted light is not reflected, i.e., a continuous angular range which is allowable for the fine wire to function as the reflected light distribution pattern and in which normals are not directed, is at least 16.7° or smaller, is desirably 6.8° or smaller, and is more desirably 4.3° or smaller. The number of allowable angular ranges in which normals are not directed may be more than one, but is, of course, desirably small. Furthermore, it is not preferable that a fine wire forming the reflected light distribution pattern have a short length as it has many breaks, and the aspect ratio of the fine wire has a lower limit.

As with a black matrix of a monitor including an LCD, a fine wire having a width of 10 μm or smaller is less likely to be visible with light passing through a touch screen. It is desirable that the width of a fine wire be as small as possible to improve transmittance of the touch screen and to improve visibility of the fine wire, but there are problems of an increase in resistance and an increase in risk of wire breakage when the width of the fine wire is small. Therefore, there is a trade-off depending on a detection circuit and a processing technique to be used.

From the perspective of uniformity of touch position detection accuracy within an operation region, each wire desirably has an optimal width considering the trade-off, and at least fine wires on the same layer produced in the same process desirably have a certain equal width, except for intersection portions and portions where branch fine wires are connected. An area of an intersection portion may be adjusted while a priority is given to ensuring of touch capacitance required for detection, because the area becomes small if a fine wire having a small width is used. A connection portion, in particular, a portion where a fine wire cuts into another fine wire so that outlines of the fine wires are in contact with each other, may have a shape formed while a priority is given to a manufacturing process, as the connection portion cannot be processed to have a desired shape depending on processing accuracy of the manufacturing process in many cases.

A wire desirably has a surface having low reflectance through formation of a film made of metal oxide or nitride on the surface. This has an effect of reducing luminance of reflected light, although reflectance cannot be reduced to zero in a whole range of visible wavelength.

As described so far, the touch screen 1 in the present embodiment has the reflected light distribution pattern as described above, and thus, when the touch screen 1 is spot illuminated by external light such as sun light and light of an electric bulb, reflected light from the reflected light distribution pattern is generated in all directions, while intense reflected light is generated in an extension direction of a linear wire in conventional technology. As a result, an effect obtained through anti-glare processing is provided without generating reflected light only in a particular direction, and thus high visibility is achieved.

The touch screen 1 in the present embodiment is a touch screen of a projected capacitive touch panel as described above, and has a problem of an increase in line capacitance as fine wires are densely arranged. In addition to an increase in wiring delay, if the line capacitance between detection column wires and detection row wires is high when a detection method called a mutual capacitance detection method is used, electric field coupling of column-direction wire bundles and row-direction wire bundles as detection electrodes increases, and an electric field change occurring upon a touch with an indicator such as a finger, i.e., a mutual capacitance change, decreases. As a result, a problem concerning characteristics of reduction of detection sensitivity arises.

The line capacitance mainly includes (1) coupling capacitance in the vicinity of intersection portions of the detection column wires 2 and the detection row wires 3 and (2) coupling capacitance in the vicinity of portions where the detection column wires 2 and the detection row wires 3 run in parallel to each other.

As for the above-mentioned coupling capacitance (1), reduction of the number of intersection portions is effective in reducing the line capacitance, but the number of intersection portions cannot be reduced to the extent that touch position detection accuracy is sacrificed.

As for the above-mentioned coupling capacitance (2), an increase in distance between a detection column wire 2 and a detection row wire 3 at a portion where the detection column wire 2 and the detection row wire 3 run in parallel to each other is effective. For example, the distance between the detection column wire 2 and the detection row wire 3 can be increased by arranging, at a portion where a fine wire included in the detection column wires 2 and a fine wire included in the detection row wires 3 intersect with each other, e.g., at the intersection portion C enclosed by the dashed line in FIG. 2, the detection column wire 2 and the detection row wire 3 so that midlines of the fine wires intersect with each other at a right angle, i.e., 90°, and the detection column wire 2 and the detection row wire 3 are separated from each other so as not to be intertwined as increasing distance from the intersection portion in the vicinity of the intersection portion.

When wires are arranged so that the density and positions of intersection portions simply become the same in a case of forming a wiring pattern with linear fine wires as shown in FIG. 4 as in the conventional technology and in a case of forming a wiring pattern having the reflected light distribution pattern as shown in FIG. 2, for example, the distance between the detection column wire 2 and the detection row wire 3 becomes substantially the same in both cases, except for a certain portion of the reflected light distribution pattern having a fine shape, but uneven display is more likely to occur in the conventional wiring pattern as the density of fine wires is lower in the conventional wiring pattern. This is because the human eyes have such characteristics that a periodic change of luminance is more visible when the period is longer, in other words, when there is a narrow region having a different luminance in a wide region having uniform luminance. By arranging the reflected light distribution patterns as in the present embodiment, the density of fine wires can be increased, and uneven display can be reduced.

In a case where the detection wires 2 and 3 are formed by linear fine wires as shown in FIG. 5 as in the conventional technology, resistance of the detection wires 2 and 3 can be kept low as in the conventional wiring pattern. In a case where the reflected light distribution patterns are electrically connected to and become parts of at least the detection column wires 2 or the detection row wires 3 as shown in FIG. 2, for example, resistance of the detection wires 2 and 3 can be kept low by electrically connecting the reflected light distribution patterns by linear fine wires.

Figure 18:
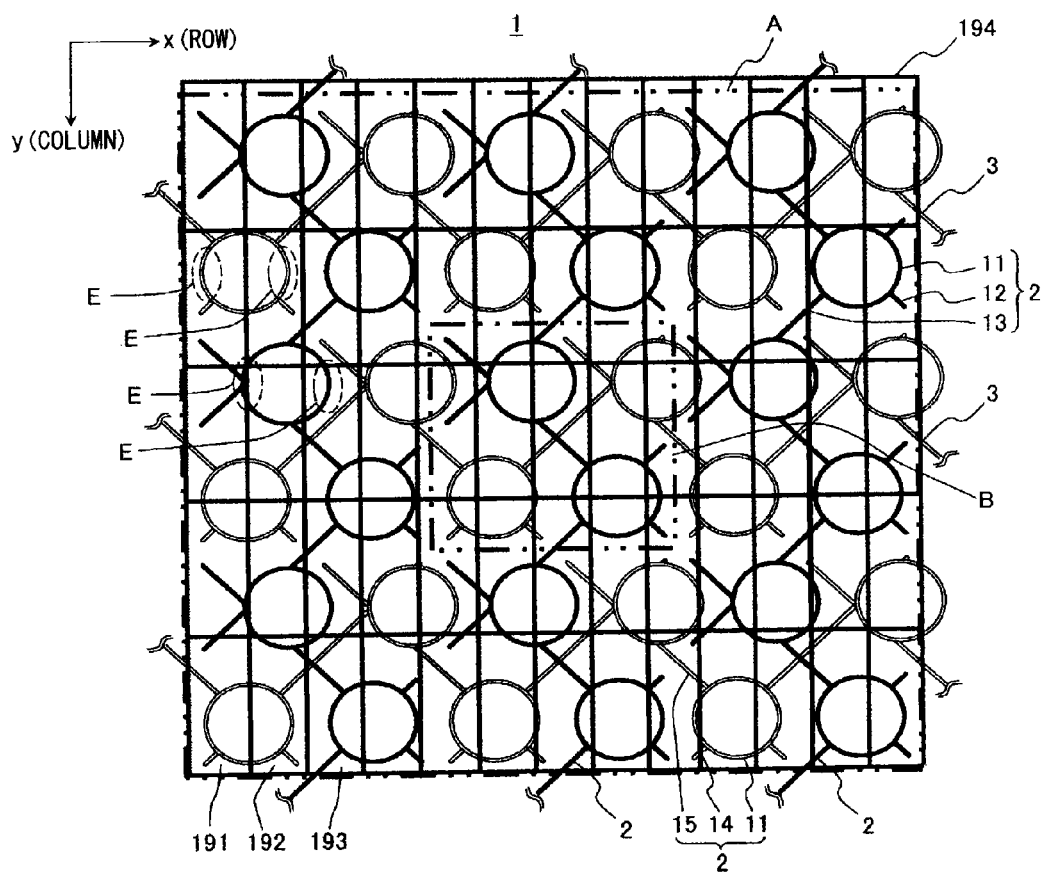
FIG. 18 is a projection showing a positional relationship between pixels and wires in a display apparatus equipped with a touch screen.

FIG. 17 is a projection showing a modification of the touch screen 1 in Embodiment 1 of the present invention. FIG. 18 is a projection when a display apparatus is equipped with the touch screen 1 in the present invention. The following describes a case where the longitudinal direction of rectangular pixels each having a color of red, green, or blue in the display apparatus coincides with the column direction (y direction) of the touch panel, and the transverse direction of the pixels coincides with the row direction (x direction) of the touch panel.

In contrast to the touch screen 1 shown in FIG. 2, in the touch screen 1 shown in FIG. 17, the reflected light distribution patterns 11 are arranged so that positions, in the x direction, of circles forming the reflected light distribution patterns are offset between rows. In other words, from among reflected light distribution patterns 11 included in the same basic pattern, reflected light distribution patterns 11 serving as the detection column wires 2 and reflected light distribution patterns 11 serving as the detection row wires 3 arranged at different positions in the y direction are arranged so that positions of the reflected light distribution patterns 11 in the x direction do not match each other in FIG. 17, whereas the reflected light distribution patterns 11 are arranged so that the positions in the x direction match each other in FIG. 2.

FIG. 18 shows red pixels 191, green pixels 192, blue pixels 193, and a black matrix 194 of the display apparatus equipped with the touch screen 1 according to the present invention. In the modification of Embodiment 1, regions E, of curved portions of the reflected light distribution patterns 11, including many components parallel to the longitudinal direction of the pixels of the display apparatus equipped with the touch screen are dispersed so as not to be aligned with each other in the longitudinal direction of the pixels. With such configuration, a change, in the transverse direction of the pixels of the display apparatus, of an opening ratio in the longitudinal direction of the pixels, which is likely to cause uneven display and the like, is improved.

Figure 19A:
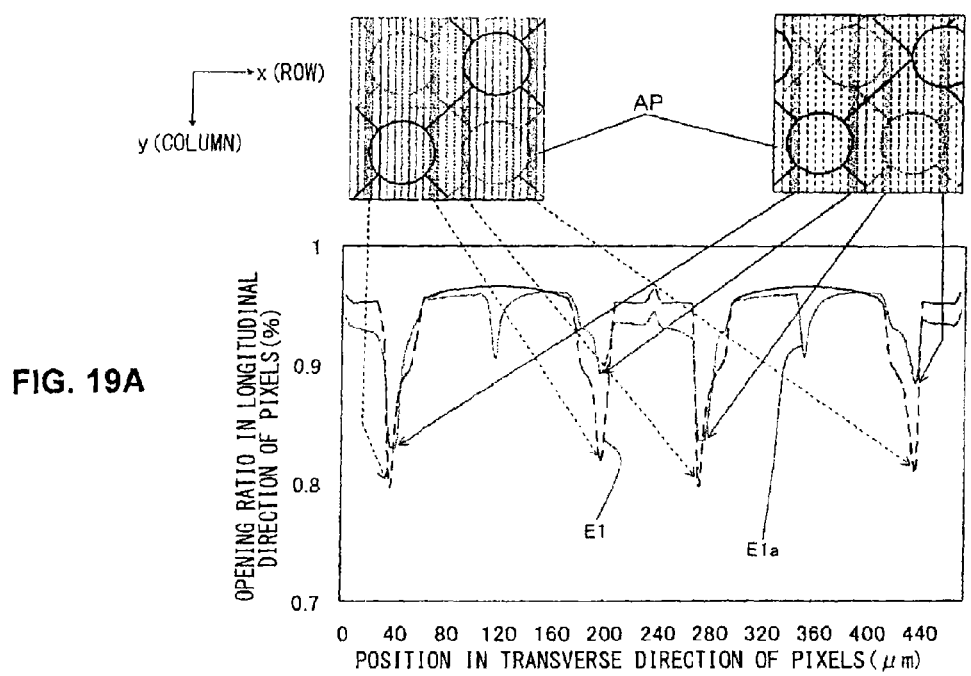
FIGS. 19A, 19B are graphs showing opening ratio distribution in a longitudinal direction of pixels and a conceptual diagram showing an effect of improving an opening ratio change.
Figure 19B:
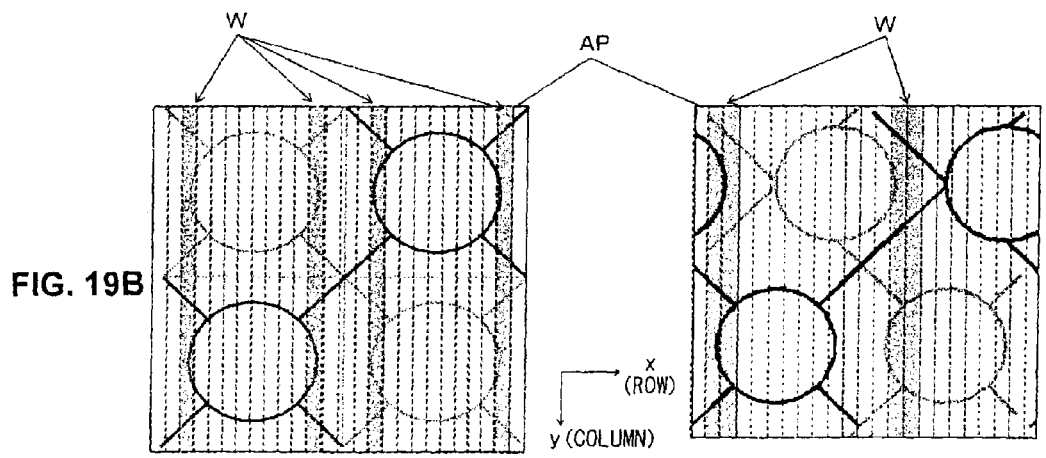

FIG. 19A shows the effect of improving the change of the opening ratio, and FIG. 19B is a conceptual diagram showing a method for calculating the change of the opening ratio in the longitudinal direction of the pixels and a factor of the improvement effect. The opening ratio is a ratio of a region in which there is no detection wire of the touch panel in an unit area, i.e., an area defined by the length in the longitudinal direction of pixels in the basic pattern and the divided width in the transverse direction of the pixels. In a region having a low opening ratio, light from the display apparatus is blocked, and it becomes dark, leading to uneven display and the like. The divided width in the transverse direction for use in calculation of the opening ratio in the longitudinal direction of the pixels depends on luminance and resolution of the display apparatus equipped with the touch screen 1 in the present invention and a distance from a user, but it is easy to associate actual uneven display when the divided width falls within a range of approximately 1 μm to 10 μm.

FIG. 19A is described in more detail. A region indicated by a reference sign "AP" in FIG. 19A is the unit area for use in calculation of the opening ratio in the longitudinal direction of the pixels. In a graph shown in FIG. 19A, a bold dashed line indicated by a reference sign "E1" represents a change of the opening ratio in the longitudinal direction of the pixels in the touch screen 1 in Embodiment 1, and a thin solid line indicated by a reference sign "E1a" represents a change of the opening ratio in the longitudinal direction of the pixels in the modification of the touch screen 1 in Embodiment 1. Furthermore, correspondences between the unit area included in the basic pattern in the touch screen 1 in Embodiment 1 and the opening ratio E1 at a position of a dark portion are indicated by dotted arrows, and correspondences between the unit area included in the basic pattern in the modification of the touch screen 1 and the opening ratio E1*a* at the position of the dark portion are indicated by solid arrows. The unit area corresponding to the position of the dark portion of the opening ratio E1 is shaded. It can be understood from FIG. 19A that, by dispersing regions, of the reflected light distribution pattern, including many components parallel to the longitudinal direction (y direction) of the pixels in the transverse direction (x direction) of the pixels, a range of the opening ratio in the longitudinal direction of the pixels is reduced.

FIG. 19B is described in more detail. FIG. 19B shows an enlarged view of the basic pattern in the touch screen 1 in Embodiment 1 on the left side, and shows an enlarged view of the basic pattern in the modification of the touch screen 1 in Embodiment 1 on the right side. In FIG. 19B, unit areas in which curved portions parallel to the longitudinal direction of the pixels are aligned with each other are indicated by a reference sign "W", and are shaded. In the touch screen 1 in Embodiment 1, there are four regions in which curved portions parallel to the longitudinal direction of the pixels are aligned with each other. In contrast, in the modification of the touch screen 1 in Embodiment 1, regions, of the reflected light distribution patterns, including many components parallel to the longitudinal direction (y direction) of the pixels are dispersed in the transverse direction (x direction) of the pixels, and the number of regions in which curved portions parallel to the longitudinal direction of the pixels are aligned with each other is reduced to two.

In the basic pattern, when curved portions, of the reflected light distribution patterns, including many components parallel to the longitudinal direction of the pixels are arranged at the same positions in the transverse direction of the pixels, the opening ratio in the longitudinal direction of the pixels is significantly reduced, the change in the transverse direction of the pixels increases, and uneven display in the vertical direction (unevenness in vertical stripes) occurs. In addition, uneven display is more likely to be visible as a period of the change is large. In the present modification, arrangements of the reflected light distribution patterns are shifted in the transverse direction to disperse curved portions including many components parallel to the longitudinal direction of the pixels for improvement of the change, in the transverse direction, of the opening ratio in the longitudinal direction of the pixels, and to reduce a repetition period of the change. As a result, uneven display can be made to be less likely to be visible.

The effects of the present invention are summarized as follows: as for reduction of transmittance in a wiring portion occurring when an opaque material, such as metal, and a light-reflective material are used in wires, reduction of transmittance of the touch screen can be suppressed by making the wires fine.

By connecting the predetermined number of detection column wires 2 to form a single column-direction wire bundle 6 and connecting the predetermined number of detection row wires 3 to form a single row-direction wire bundle 7, an impact of wire breakage, which is a defect caused by making the wires fine, can be suppressed, reduction of transmittance of the touch screen can be suppressed, and electric characteristics can be made uniform in a wider area. This enables uniform detection of touch capacitance.

Since reduction of transmittance can be suppressed by making the wires fine, the density of the fine wires can be increased, and uneven display can be reduced. However, reduction of distances between the detection column wires 2 and the detection row wires 3 causes a problem of an increase in parasitic capacitance, specifically, line capacitance, therebetween.

By arranging the reflected light distribution patterns 11 including curved fine wires, the density of the fine wires is increased, the distances between the detection column wires 2 and the detection row wires 3 can be increased, and, consequently, the increase in line capacitance can be suppressed.

By suppressing the increase in line capacitance, highly-sensitive touch position detection can be enabled. Furthermore, since the density of the fine wires can be increased, uneven display can also be reduced.

Reflected light and reflected diffracted light from the reflected light distribution pattern 11 including the curved fine wire are directed towards all directions, and thus reflected light is not generated only in a particular direction at spot illumination. Visibility can thereby be improved.

As described so far, in the present embodiment, the predetermined number of detection column wires 2 is connected to form a single column-direction wire bundle 6, the predetermined number of detection row wires 3 are connected to form a single row-direction wire bundle 7, and the reflected light distribution patterns 11 including fine wires including curved fine wires are arranged. As a result, reduction of visibility caused due to reflected light and uneven display can be suppressed. Furthermore, deterioration of electric characteristics, such as line capacitance, can be suppressed, and uniform and highly-sensitive detection of touch capacitance can be enabled.

In the present embodiment, in each of the reflected light distribution patterns 11, a fine wire including a curved fine wire is closed, as shown in FIG. 2 as described above. Consequently, the reflected light distribution patterns allowing normals to a curved portion to be directed towards all directions can be achieved.

In the present embodiment, the reflected light distribution patterns 11 may be included in at least the detection column wires 2 or the detection row wires 3. As shown in FIG. 2 described above, the reflected light distribution patterns 11 may be included in the detection column wires 2 and the detection row wires 3.

As shown in FIG. 5 as described above, the reflected light distribution patterns 11 may be electrically isolated, i.e., insulated, from the detection column wires 2 and the detection row wires 3.

The effect of preventing intense reflected light from being generated only in a particular direction at spot illumination with external light, such as sunlight and light of an electric bulb, as described above can be achieved both in a case where the reflected light distribution patterns 11 are included in at least the detection column wires 2 or the detection row wires 3, and in a case where the reflected light distribution patterns 11 are insulated from the detection column wires 2 and the detection row wires 3.

Furthermore, in the touch screen in the present embodiment, a region in which a column-direction wire bundle and a row-direction wire bundle intersect with each other includes repetition of the basic pattern including reflected light distribution patterns including curved portions, row wires, and column wires, and, inside the basic pattern, the reflected light distribution patterns may be arranged so that regions, of curved portions of the reflected light distribution patterns, parallel to the longitudinal direction of the pixels of the display apparatus equipped with the touch screen are not aligned with each other in the longitudinal direction of the pixels. With such configuration, the change of the opening ratio occurring between opening portions of pixels of the display apparatus can be reduced, and uneven display, such as moire, is made to be less likely to be visible when the display apparatus is equipped with the touch screen.

Embodiment 2

Figure 20:
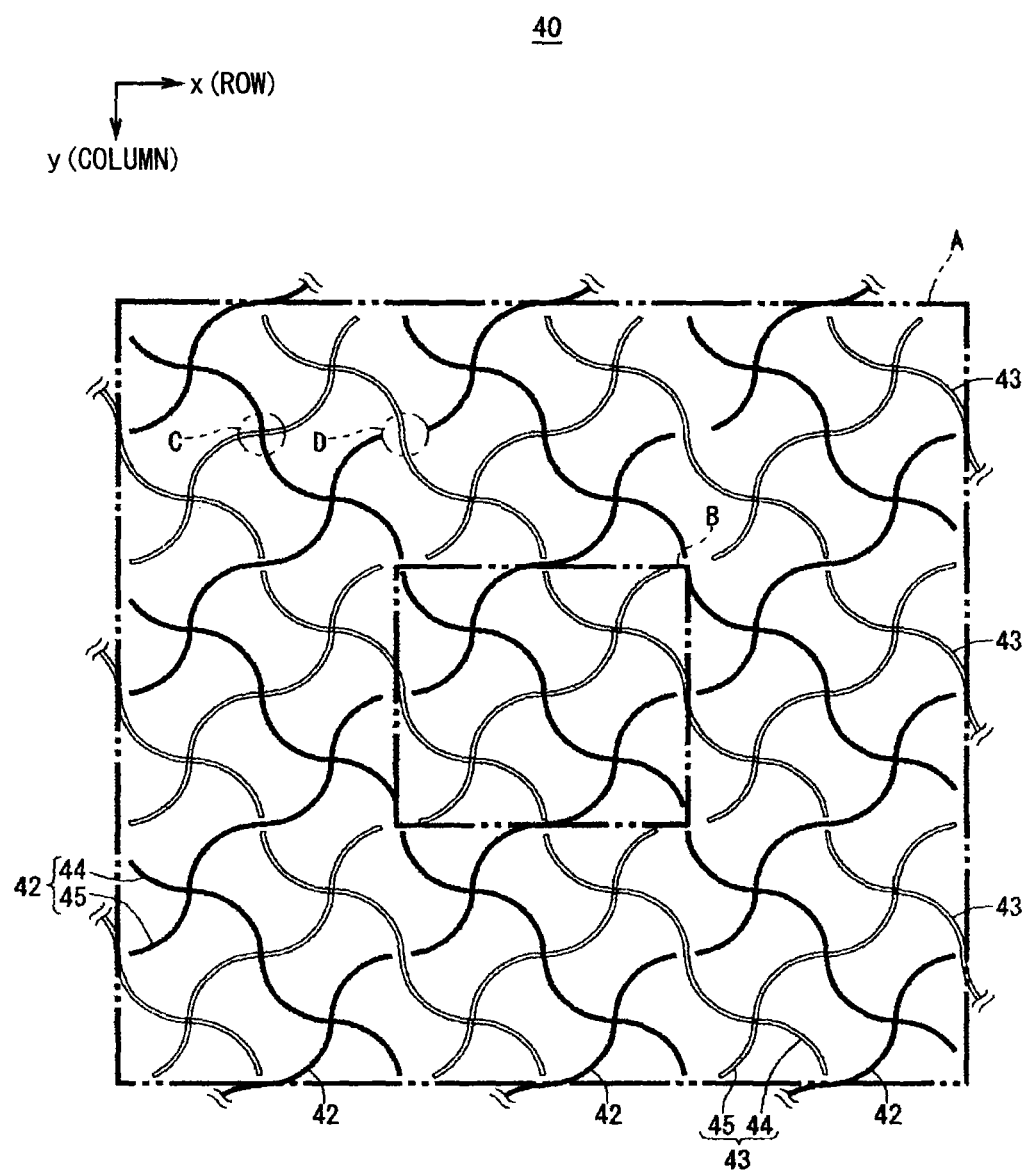
FIG. 20 is a projection showing a wiring pattern in a touch screen 40 in Embodiment 2 of the present invention.

FIG. 20 is a projection showing a wiring pattern in a touch screen 40 in Embodiment 2 of the present invention. In the present embodiment, the detection wires 42 and 43 are also configured so as to function as the reflected light distribution patterns. In the present embodiment, the detection wires 42 and 43 do not include a closed fine wire, i.e., a fine wire whose midline is closed, as shown in FIG. 20.

Specifically, the detection wires 42 and 43 are not linear but are wavy curved fine wires including 90° arcuate fine wires connected together and having convex and concave portions, and are arranged so that the convex and concave portions face each other. When the procedures for selecting the reflected light distribution patterns described in Embodiment 1 are applied to wires in the region B in FIG. 20, two wavy fine wires connected so as to form approximately a swastika at the center of the region B are selected in the case (d) with four end points. Furthermore, four 90° arcuate fine wires as parts of fine wires extending outwards from the region B can be selected in the case (d) with eight end points in total. Branch fine wires 44 and 45 are broken fine wires as shown by a circle D in a dashed line in FIG. 20, and do not form the reflected light distribution pattern even if combined, as a central angle of the arc is smaller than 90°. The branch fine wires 44 and 45, however, can be made so as to function as the reflected light distribution pattern with use of 90° arcuate fine wires having small radiuses. As a result, as in a case of using the reflected light distribution patterns 11 that are closed as in Embodiment 1 described above, the lengths of fine wires at portions where the detection column wires 42 and detection row wires 43 become close to each other can be reduced, and an average distance between the detection column wires 42 and the detection row wires 43 can be increased.

The above-mentioned condition is described in detail. When a fine wire forming one of the detection wires 42 and 43 except for a branch fine wire is considered, the fine wire includes repetition of two 90° arcuate wavy fine wires connected together and having convex and concave portions extending upwards or downwards to the right, and an average extension direction in the repetition unit is obtained to set the obtained extension direction to an average extension direction. Although the repetition unit becomes a part of the reflected light distribution pattern in FIG. 20, the repetition unit is typically considered even if it is not the part of the reflected light distribution pattern.

A point p is set on an outline of a given fine wire, and an intersection point q is set on an outline of another fine wire that has an outline intersecting with a straight line passing through the point p and having an inclination perpendicular to the average extension direction, and is not electrically connected to the fine wire on which the point p is set. When the straight line is shifted in parallel while maintaining the inclination thereof, an intersection point p' of the shifted straight line and the outline of the fine wire on which the point p is set, an intersection point q' of the shifted straight line and the outline of the fine wire on which the point q is set, and the distance between the points p' and q' are obtained. Next, a section Zp of the intersection point p' in which the above-mentioned distance does not change even when the straight line is shifted in parallel, and a section Zq of the intersection point q' corresponding to the section Zp are obtained.

The section Zp of the fine wire on which the intersection point p' is set and the section Zq of the fine wire on which the intersection point q' is set are defined to be parallel to each other.

When a section in which adjacent fine wires are parallel to each other is long, wiring density in the section in which adjacent fine wires are parallel to each other is reduced if the distance between fine wires in the parallel section, specifically, the distance between the points p and q when the point p is set within the parallel section, is increased. In a case where the detection wires 42 and 43 function as the reflected light distribution patterns, in order to increase an average distance between adjacent fine wires and to suppress reduction of the wiring density between the adjacent fine wires, it is desirable that the parallel section be shorter than the average distance between adjacent fine wires, and it is the most desirable that there be no parallel section. The above-mentioned average distance between adjacent fine wires refers to an average distance between the points p and q when the original point P is moved within a range in which the same fine wires are adjacent to each other.

FIG. 20 shows an example of the wiring pattern in which there is no parallel section. Wavy portions, of a detection column wire 42 and a detection row wire 43 adjacent to each other, extending upwards to the right each have an average extension direction of 45°, but a distance therebetween is not constant and changes. Wavy portions, of a detection column wire 42 and a detection row wire 43 adjacent to each other, extending downwards to the right are similar to the wavy portions extending upwards to the right except that they each have an average extension direction of −45°, and a distance therebetween is not constant and changes.

A section in which adjacent fine wires are parallel to each other can be eliminated not only in a case where the detection wires only include curved fine wires as in the present embodiment but also in a case of the wiring pattern including linear fine wires as shown in FIG. 2. For example, in the wiring pattern shown in FIG. 2 described above, the parallel section is eliminated by adjusting a size of a fine wire so that the fine wire is in contact with, along a straight line that is in contact with an outline of a circular fine wire with an inclination of ±45° corresponding to the extension direction of a linear fine wire, another circular fine wire. FIG. 21 shows an example of the basic pattern of wires and the vicinity of a DC component of the Fourier transform of the basic pattern in a case where the basic pattern is formed only by curved wires. Even at illumination with spot light, reflected light can be dispersed, and reduction of visibility can be suppressed.

Figure 21B:
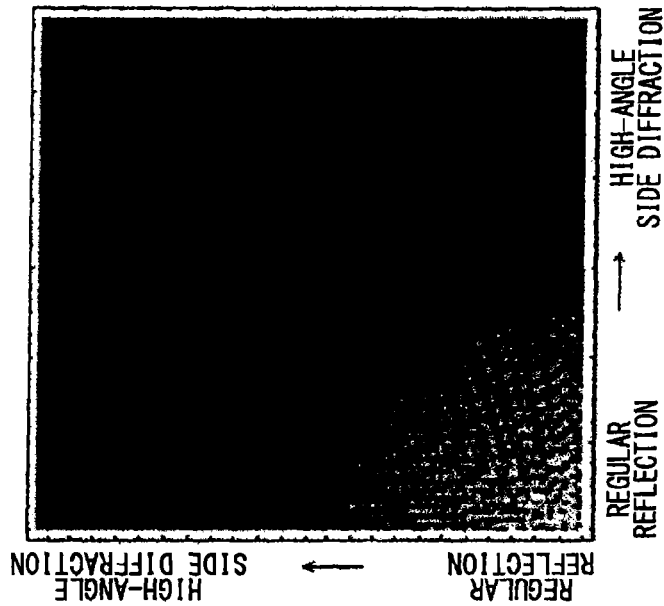
FIGS. 21A, 21B show an example of a basic pattern of wires and the vicinity of a DC component of the Fourier transform of the basic pattern.
Figure 21A:
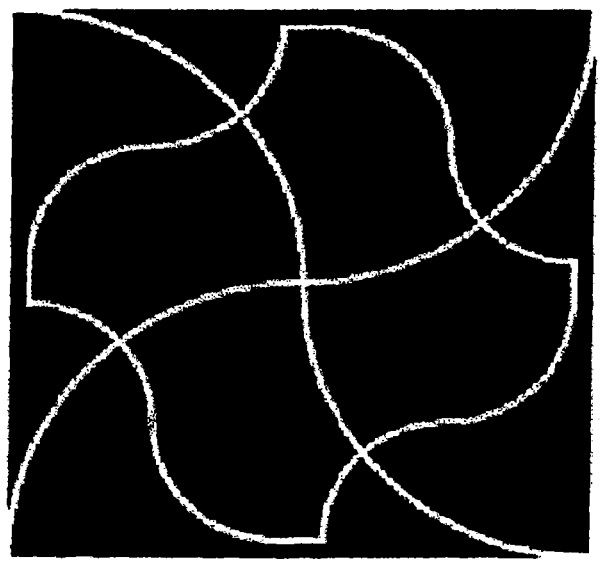

FIG. 21A is a diagram showing an example of a simplified basic pattern of wires, and FIG. 21B is an enlarged view of the vicinity of a DC component of the Fourier transform of the basic pattern of FIG. 21A. In FIG. 21A, a white portion represents a portion where there is a fine wire, and a black portion represents a portion where there is no fine wire.

The wiring pattern shown in FIGS. 21A, 21B includes fine wires having the same size as the size of the basic pattern and forming approximately a swastika, and a closed fine wire formed by connecting, at their end points, four wavy curved fine wires having a size smaller than one-half of the size of the basic pattern both in row and column directions, and having concave and convex portions. The closed fine wire has four concave portions when viewed from a direction perpendicular to a surface, of a transparent substrate, facing a user.

Although a branch fine wire or an isolated fine wire may be disposed to reduce uneven display, the disposed branch fine wire or isolated fine wire desirably functions as the reflected light distribution pattern.

In the above-mentioned touch screen 40 having the reflected light distribution patterns, the basic pattern including repetition of wires does not include a linear fine wire, and thus reflected light is no longer generated only in a particular direction, and the effect obtained through antiglare processing is provided when the touch screen 40 is spot illuminated by external light, such as sun light and light of an electric bulb, while intense reflected light is generated in the extension direction of a linear wire in the conventional technology. The touch screen 40 in the present embodiment thus has high visibility. The touch screen 40 also has low line capacitance, can achieve reduction of the wiring delay and improvement of responsiveness, and has excellent electrical characteristics.

In the present embodiment, fine wires constituting the detection wires 42 and 43 of the touch screen 40 include a branch fine wire, but do not include an isolated fine wire that is not electrically connected to the detection wires 42 and 43. The configuration of the touch screen 40 is not limited to this configuration, and one of or both of a branch fine wire and an isolated fine wire that is not electrically connected to the detection wires 42 and 43 may be disposed on the touch screen 40.

As a result, the density of arranged fine wires can be increased.

Although the reflected light distribution pattern 11 is described to be a fine wire allowing normals at any points on the reflected light distribution pattern 11 to be directed towards all directions in Embodiment 1, the normals do not necessarily have to be completely directed towards all directions. The effect can be obtained even when some of directions towards which the normals at any points on the reflected light distribution pattern 11 are directed are lost, and increases as the directions of the normals become close to all directions. Therefore, the effect is expected to be obtained to a certain extent even in a case where the reflected light distribution pattern has a broken portion as with the branch fine wires 44 and 45, i.e., in a case where normals at any points on the fine wire are not completely directed towards all directions. For example, when a size of the broken portion is equal to or smaller than a region (minimum separation threshold) in which a visual angle becomes one minute of arc (an angle equal to 1/60 of one degree) with a visual distance of 300 mm to 500 mm, which is a typical visual distance when the touch screen is used, the broken portion is not viewed as a discontinuous portion with the human eyes, and it is considered that a similar effect to that obtained when there is no broken portion can be obtained.

Figure 22:
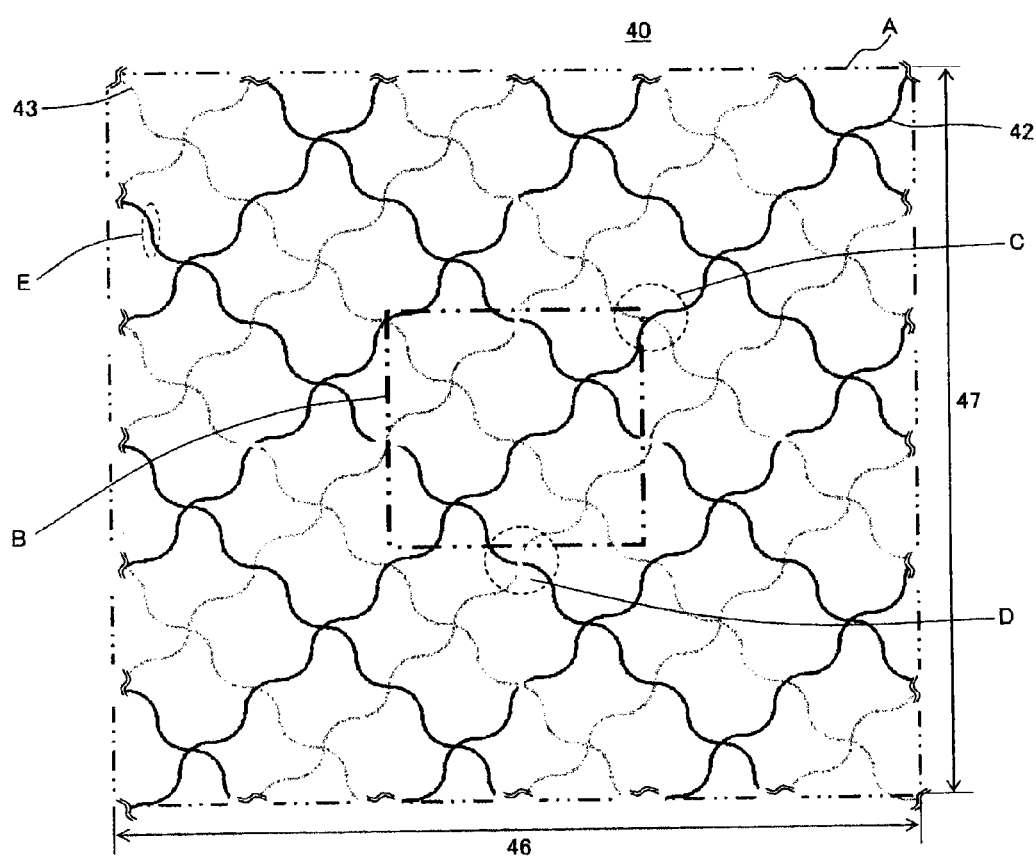
FIG. 22 is a projection showing an example of another wiring pattern in Embodiment 2 of the present invention.

FIG. 22 is a projection showing a modification of the touch screen 40 in Embodiment 2. In the modification of Embodiment 2, in a basic pattern including a plurality of column wires and row wires only including curved portions having the same period, positions at which the column wires and the row wires intersect with each other are shifted from those shown in FIG. 20 to disperse regions E, of the column wires and the row wires only including the curved portions, parallel to the longitudinal direction of pixels so that the regions E are not aligned with each other in the longitudinal direction of the pixels. In FIG. 22, a portion where a column-direction wire bundle and a row-direction wire bundle intersect with each other, i.e., a region defined by the width 46 of the column-direction wire bundle and the width 47 of the row-direction wire bundle, is extracted.

In the touch screen in Embodiment 2, the above-mentioned "regions parallel to the longitudinal direction of pixels" can also be referred to as "wiring regions each including a portion where a normal is perpendicular to the longitudinal direction of the pixels".

Figure 23:
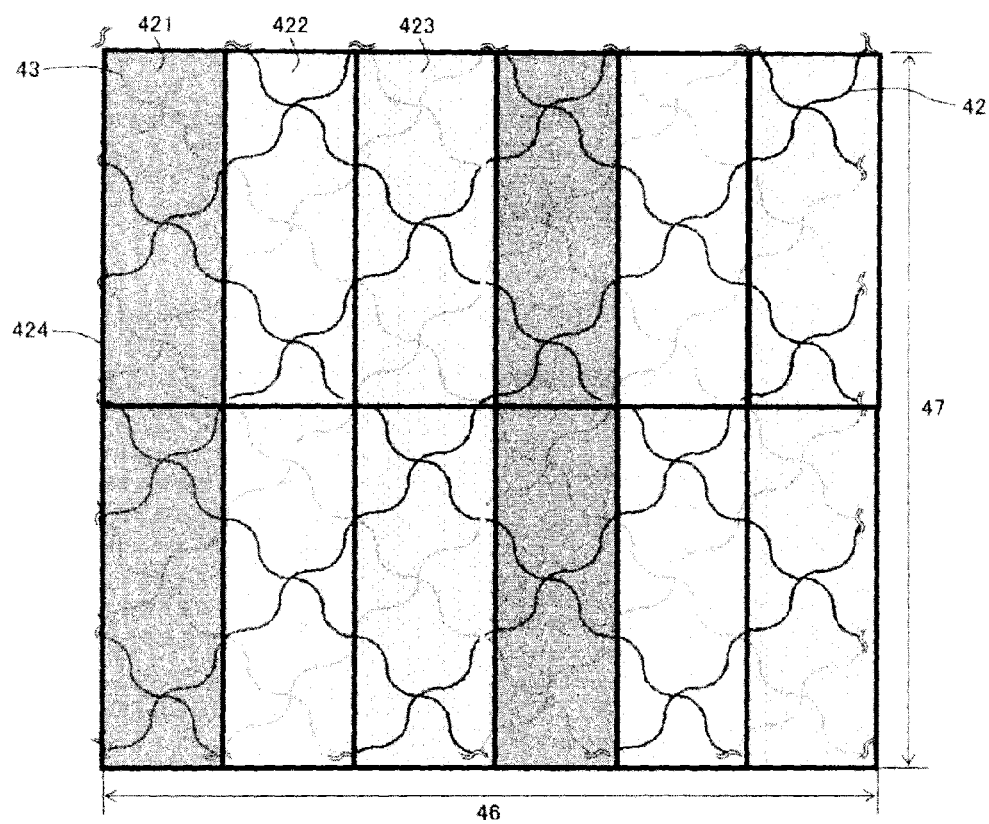
FIG. 23 is a projection showing a positional relationship between pixels and wires in a display apparatus equipped with a touch screen.

FIG. 23 is a projection when a display apparatus is equipped with the touch screen 40 in the present modification. FIG. 23 shows red pixels 421, green pixels 422, blue pixels 423, and a black matrix 424 of the display apparatus equipped with the touch screen 40 according to the present invention.

FIG. 24 shows another modification of Embodiment 2. In the present modification, in the basic pattern, wires including curved portions having different periods are alternately arranged to disperse curved portions parallel to the longitudinal direction of pixels so that the curved portions are not aligned with each other in the longitudinal direction of the pixels.

FIG. 25 is a graph showing effects of the modification of Embodiment 2 in which the curved regions E including many components parallel to the longitudinal direction of the pixels are dispersed in the transverse direction of the pixels, and shows the change, in the transverse direction of the pixels, of the opening ratio in the longitudinal direction of the pixels. The opening ratio is calculated by the method described in Embodiment 1. FIG. 25 shows a change AA of the opening ratio in the embodiment shown in FIG. 20, a change BB of the opening ratio in the other modification of Embodiment 2 shown in FIG. 24, and a change CC of the opening ratio in the other modification of Embodiment 2 shown in FIG. 22. In the change AA of the opening ratio in the embodiment shown in FIG. 20, regions including many components parallel to the longitudinal direction of pixels are aligned with each other in the longitudinal direction of the pixels. It is shown that, by dispersing the curved regions including many components parallel to the longitudinal direction of the pixels, the change of the opening ratio is reduced to 5% or smaller, and the repetition period of the change is reduced to 0.1 mm or less to make uneven display to be less likely to be visible.

As described above, in the touch screen 40 in the present embodiment, the wiring pattern that is made of a light-reflective material, only includes curved portions when viewed from a direction perpendicular to a surface, of a transparent substrate, facing a user, and is disposed so that normals to the curved portions are directed towards all directions may be formed on the transparent substrate, a region at which a column-direction wire bundle and a row-direction wire bundle intersect with each other may include repetition of a basic pattern including a plurality of column wires and row wires, and, in the basic pattern, parts, of curved portions of the column wires and row wires, where normals are parallel to the transverse direction of pixels of the display apparatus may be arranged so as not to be aligned with each other in the longitudinal direction of the pixels of the display apparatus. With such configuration, the change of the opening ratio occurring between opening portions of the pixels of the display apparatus can be reduced, and uneven display, such as moire, is less likely to be visible when the display apparatus is equipped with the touch screen.

Embodiment 3

In Embodiments 1 and 2 described above, the detection column wires 2 are combined with the detection row wires 3 one by one in a grid pattern, for example, as shown in FIG. 1. Such configuration can increase the density of intersection portions as arranged and thus increase touch position detection accuracy, but can also increase line capacitance. Especially when the density of fine wires is increased to reduce uneven display, the line capacitance is likely to be increased. In the present embodiment, a method for improving visibility with respect to reflected light, further increasing the density of fine wires, but suppressing the line capacitance is described.

Figure 26:
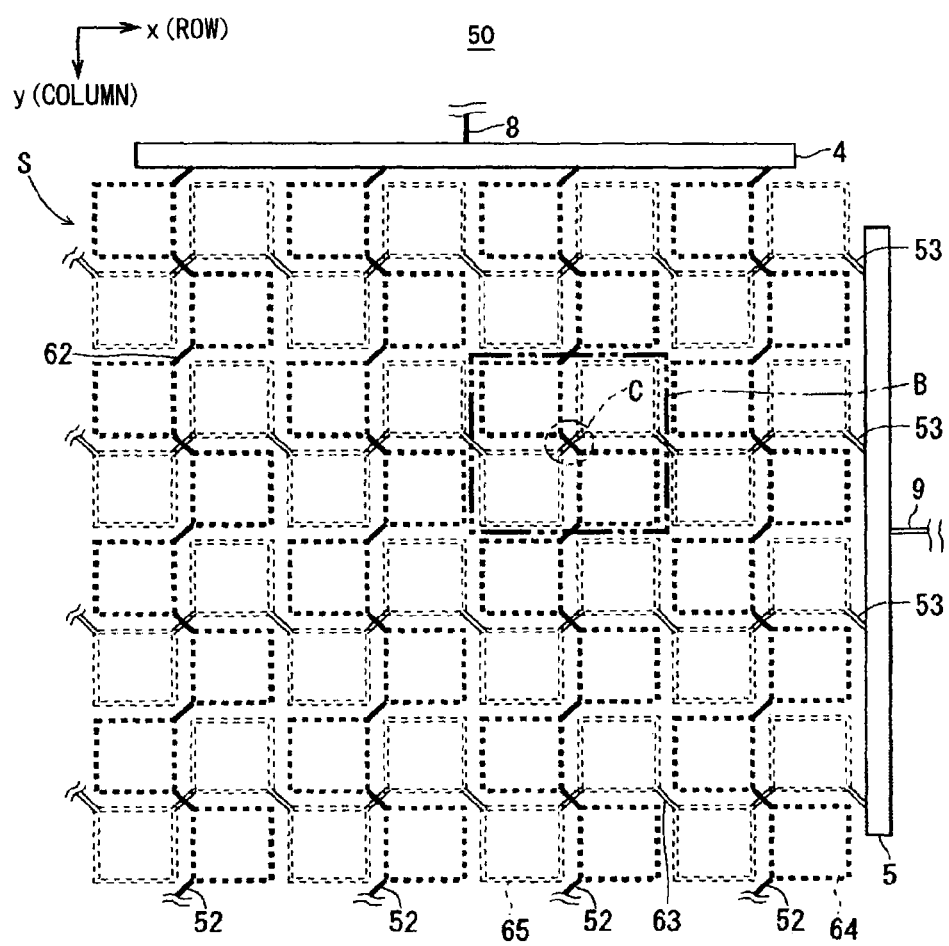
FIG. 26 is a projection showing a wiring pattern in a touch screen 50 in Embodiment 3 of the present invention.
Figure 27:
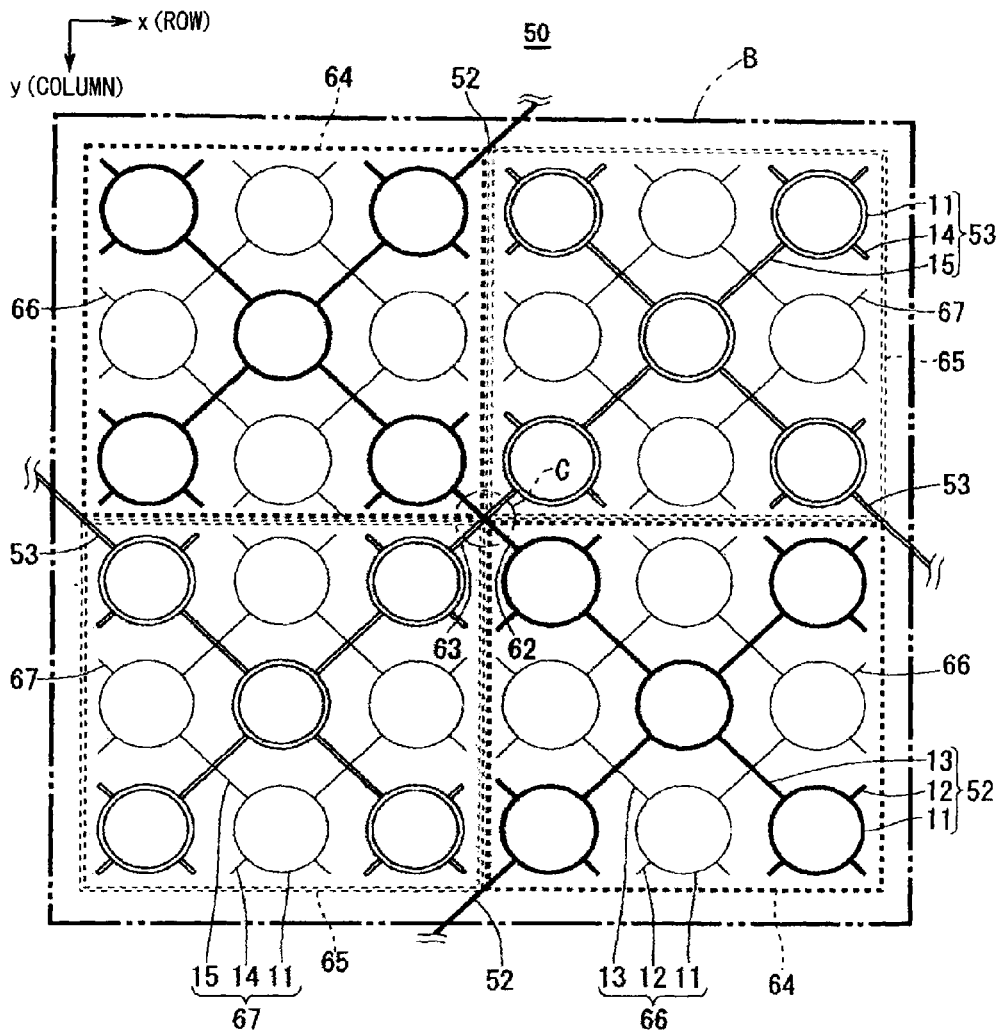
FIG. 27 is a projection showing an enlarged view of a region B in FIG. 26.

FIG. 26 is a projection showing a wiring pattern in a touch screen 50 in Embodiment 3 of the present invention. FIG. 26 shows a case where detection wires 52 and 53 are arranged in two divided regions. FIG. 27 is a projection showing an enlarged view of a region B in FIG. 26.

In the present embodiment, the region B in which a basic pattern of wires is disposed is divided into two regions, that is, rectangular regions (hereinafter, referred to as "first regions") 64 indicated in bold dashed lines and rectangular regions (hereinafter, referred to as "second regions") 65 indicated in double dashed lines.

The first regions 64 do not include the detection row wires 53, and include the detection column wires 52 and isolated fine wires (hereinafter, referred to as "first isolated fine wires") 66. The second regions 65 do not include the detection column wires 52, and include the detection row wires 53 and isolated fine wires (hereinafter, referred to as "second isolated fine wires") 67. In the following description, the first isolated fine wires 66 and the second isolated fine wires 67 are also collectively referred to as "isolated fine wires".

In FIG. 26, fine wires in the first and second regions 64 and 65 shown in FIG. 27 are omitted for the sake of clarity. The first and second regions 64 and 65 respectively include the isolated fine wires 66 and 67 in the present embodiment, but may not include the isolated fine wires 66 and 67.

In the present embodiment, the first regions 64 are electrically connected to each other with a short fine wire (hereinafter, referred to as a "first connection fine wire") 62, and the second regions 65 are electrically connected to each other with a short fine wire (hereinafter, referred to as a "second connection fine wire") 63. That is to say, in the present embodiment, regions of the same type are electrically connected to each other to form the detection column wires 52 and the detection row wires 53. As a result, the density of fine wires can be increased while suppressing the line capacitance. In the following description, the first connection fine wire 62 and the second connection fine wire 63 are also collectively referred to as "connection fine wires".

In the present embodiment, two connection fine wires 62 and 63 each connecting regions of the same type to each other intersect with each other with the insulating layer 18 therebetween at an appropriate density to form an intersection portion C.

Although the detection row wires 53 and the second connection fine wire 63 are indicated in double lines in FIGS. 26 and 27 for the sake of clarity, the detection row wires 53 and the connection fine wire 63 are each actually a single fine wire. Although only the first and second connection fine wires 62 and 63 are illustrated outside the first and second regions 64 and 65, a branch fine wire or an isolated fine wire may be disposed if it is necessary for reduction of uneven display and the like.

Although the first region 64 and the second region 65 are illustrated so as to have a gap therebetween in FIG. 26 for the sake of clarity, the gap is provided for visibility of the diagram, and the first region 64 and the second region 65 may be illustrated so as to be provided close to each other as shown in FIG. 27. In FIG. 26, a separation line for separating the first region 64 and the second region 65 may be drawn so that the first region 64 and the second region 65 do not have a gap therebetween as shown in FIG. 27.

As described above, in the present embodiment, an operation region is divided into two types of regions, i.e., the first region 64 and the second region 65, one of the detection column wires 52 and the detection row wires 53 and, if necessary, an isolated fine wire are arranged in one of the two regions, and the other one of the detection column wires 52 and the detection row wires 53 and, if necessary, an isolated fine wire are arranged in the other one of the two regions. As a result, the detection column wires 52 and the detection row wires 53 become close to each other only at intersection portions and boundary portions between the two regions, and the detection column wires 52 and the detection row wires 53 do not become close to each other in most of the first and second regions 64 and 65. The line capacitance can be thus suppressed while increasing the density of fine wires.

In the present embodiment, the isolated fine wires 66 and 67 are provided in addition to the detection wires 52 and 53. As a result, the density of fine wires can further be increased. The first isolated fine wires 66 are electrically insulated from the detection column wires 52 with the insulating layer 18 therebetween, although this is not illustrated in FIG. 27. Similarly, the second isolated fine wires 67 are electrically insulated from the detection row wires 53 with the insulating layer 18 therebetween.

The wiring patterns inside the first and second regions 64 and 65 include the reflected light distribution patterns 11 as shown in FIG. 27. In the present embodiment, circular fine wires 11 as the reflected light distribution patterns are connected to each other by linear fine wires 13 and 15. In addition, fine wires 12 and 14 linearly extending from the circular fine wires 11 and having unconnected end points are provided to reduce uneven display. These linear fine wires 12 to 15 may be curved fine wires. Use of the curved fine wires eliminates use of the linear fine wires in the operation region, and further improves visibility with respect to reflected light.

As described above, the touch screen 50 in the present embodiment has the reflected light distribution patterns 11, and thus, when the touch screen 50 is spot illuminated by external light such as sun light and light of an electric bulb, reflected light from the reflected light distribution patterns is generated in all directions, while intense reflected light is generated in an extension direction of a linear wire in the conventional technology. As a result, an effect obtained through anti-glare processing is provided without generating reflected light only in a particular direction. Therefore, the touch screen 50 having high visibility can be achieved.

In the present embodiment, the operation region is divided into two types of regions, i.e., the first region 64 and the second region 65, one of the detection column wires 52 and the detection row wires 53 and, if necessary, an isolated fine wire are arranged in one of the two regions, and the other one of the detection column wires 52 and the detection row wires 53 and, if necessary, an isolated fine wire are arranged in the other one of the two regions. As a result, the touch screen 50 that has low line capacitance, can achieve reduction of the wiring delay and improvement of responsiveness, and has excellent electrical characteristics can be achieved.

In Embodiments 1 to 3 described above, the detection column wires 2 and the detection row wires 3 are provided on one surface of the transparent substrate 19, and the insulating layer 18 is disposed between the detection column wires 2 and the detection row wires 3 as shown in FIG. 3 described above. The configuration is not limited to this configuration, and the transparent substrate 19 may serve as the insulating layer 18 as shown in FIG. 28 described later.

Figure 28:
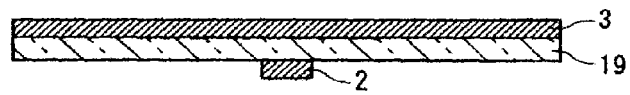
FIG. 28 is a cross section showing another example of layer configuration of a touch screen.

FIG. 28 is a cross section showing another example of layer configuration of a touch screen. In the example shown in FIG. 28, the detection row wire 3 is provided on one surface of the transparent substrate 19, and the detection column wire 2 is provided on the other surface of the transparent substrate 19. The transparent substrate 19 is made of a transparent dielectric material, and can thus function as the insulating layer 18. In this case, the process of forming the insulating layer 18 can be omitted.

Embodiment 4

A touch screen 80 in Embodiment 4 of the present invention differs from the touch screen 40 in the modification of Embodiment 2 shown in FIG. 22 in that areas of opening portions enclosed by detection wires 82 and 83 are made uniform in the basic pattern B.

Figure 29:
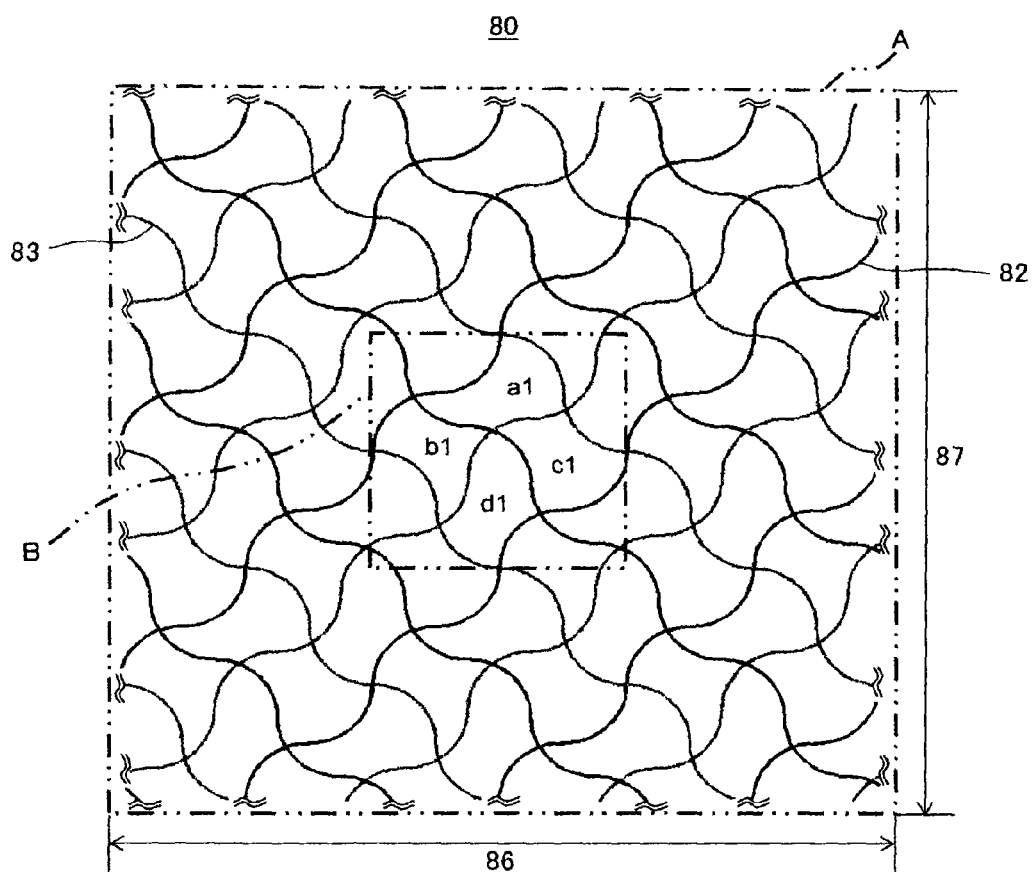
FIG. 29 is a projection showing a wiring pattern in a touch screen 80 in Embodiment 4 of the present invention.

FIG. 29 is a projection showing a wiring pattern in the touch screen 80 in Embodiment 4 of the present invention. In FIG. 29, a portion at which a column-direction wire bundle 6 and a row-direction wire bundle 7 intersect with each other, i.e., a region A defined by the width 86 of the column-direction wire bundle 6 and the width 87 of the row-direction wire bundle 7, is extracted from the operation region of the touch screen.

As in the touch screen 40 shown in FIG. 22, the detection column wires 82 and the detection row wires 83 of the touch screen 80 only include curved portions, and include repetition of two 90° arcuate wavy fine wires connected together and having convex and concave portions extending upwards or downwards to the right. The detection column wires 82 and the detection row wires 83 of the touch screen 80 thus function as the reflected light distribution patterns.

As shown in FIG. 22, the wavy fine wires extending upwards or downwards to the right become parallel to the longitudinal direction of pixels of the display apparatus at portions where 90° arcuate fine wires are connected. Directions normal to the wavy fine wires extending upwards or downwards to the right become perpendicular to the longitudinal direction of the pixels at the portions where 90° arcuate fine wires are connected.

Arrangement of the detection column wires 82 and the detection row wires 83 is achieved through shift of intersection positions from the positions shown in FIG. 22 in Embodiment 2. Specifically, as in Embodiments 1 and 2, the detection wires 82 and 83 are arranged by shifting, in the basic pattern B including the detection wires 82 and 83, the detection wires 82 and 83 so that regions E, of the detection wires 82 and 83, parallel to the longitudinal direction of the pixels are not aligned with each other in the longitudinal direction of the pixels, and areas of opening portions a1, b1, c1, and d1 enclosed by fine wires become equal to one another. The detection wires are not limited to those having a shape only including a curved portion, and may have various shapes, for example, a shape including a linear portion as in Embodiment 1.

The opening portions are enclosed by fine wires made of a light-reflective material. The fine wires enclosing the opening portions block light from a display device when viewed from a direction normal to a front surface of the display device. Fine wires blocking light, such as the detection wires 82 and 83, are not included in the opening portions a1, b1, c1, and d1. In FIG. 29, the opening portions a1, b1, c1, and d1, which are four regions enclosed by two detection column wires 82 and two detection row wires 83, are included in the basic pattern B. The opening portions a1, b1, c1, and d1 have different shapes, but have equal areas.

A region A in which a column-direction wire bundle and a row-direction wire bundle intersect with each other includes repetition of the basic pattern B including a plurality of detection column wires 82 and detection row wires 83.

The fine wires enclosing the opening portions do not necessarily have to be closed. For example, when a size of a broken portion is equal to or smaller than a region (minimum separation threshold) in which a visual angle of a person having a vision of 1.0 becomes one minute of arc (an angle equal to 1/60 of one degree) with a visual distance of 300 mm to 500 mm, which is a typical visual distance when the touch screen is used, the broken portion is not visible to the human eyes. Therefore, the fine wires enclosing the opening portions may include a broken portion having a size equal to or smaller than the minimum separation threshold.

The fine wires enclosing the opening portions are not limited to detection wires. For example, any fine wire, such as a reflected light distribution pattern insulated from the detection wires and an isolated fine wire, provided on the transparent substrate and made of a light-reflective material may be used.

Furthermore, in FIG. 29, when a line passing through the center of the amplitude of the detection wires 82 and 83 in a direction perpendicular to the extension direction of the detection wires 82 and 83 is defined as a center line, intervals between center lines may be constant. By arranging adjacent center lines at equal intervals, wiring density is made uniform, and thus uneven display can be suppressed while maintaining detection sensitivity.

Figure 30:
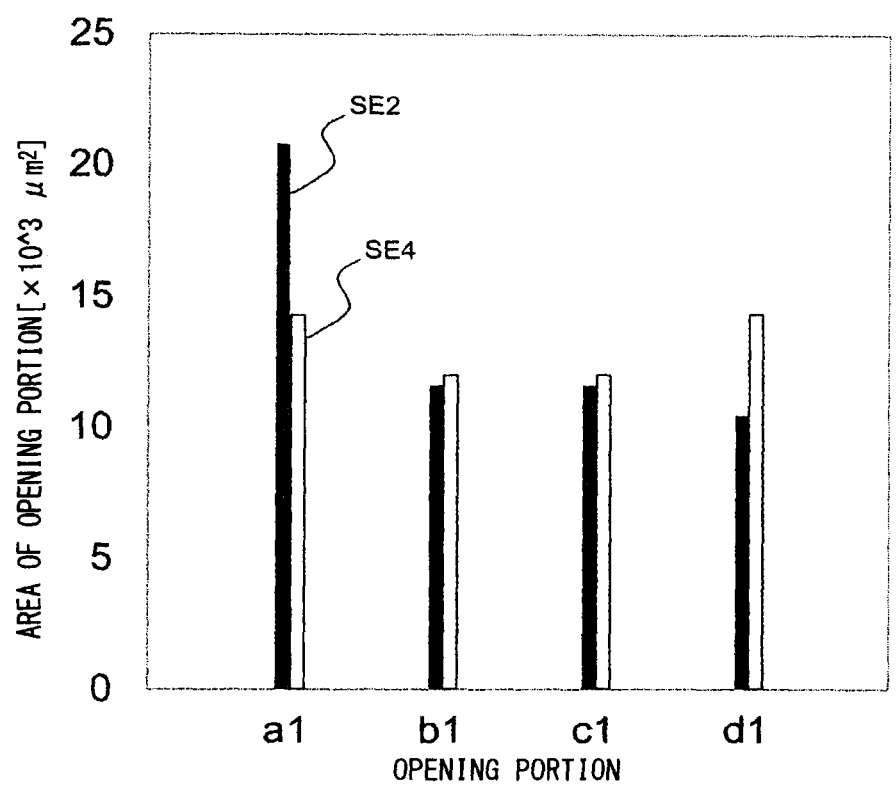
FIG. 30 is a graph showing areas of opening portions of the wiring pattern in Embodiment 4 of the present invention.

The following describes effects obtained in the present embodiment with use of FIGS. 30 and 31.

FIG. 30 is a graph showing areas of opening portions of the touch screen 40 shown in FIG. 22 in Embodiment 2 and the touch screen 80 shown in FIG. 29 in the present embodiment. As for the touch screen 40 shown in FIG. 22, areas of opening portions at positions corresponding to the opening portions a1, b1, c1, and d1 of the touch screen 80 shown in FIG. 29 are shown.

In FIG. 30, the areas of the opening portions of the touch screen 40 shown in FIG. 22 in Embodiment 2 are indicated by a reference sign "SE2", and the areas of the opening portions of the touch screen 80 shown in FIG. 29 in Embodiment 4 are indicated by a reference sign "SE4".

FIG. 31 is a histogram showing results of two-dimensional analysis of the opening ratio when the touch screen 40 shown in FIG. 22 in Embodiment 2 and the touch screen 80 shown in FIG. 29 in the present embodiment are mounted on display devices. The opening ratio is a ratio of a region in which there is no detection wire in a unit area of a display screen, and the display screen becomes brighter as the opening ratio increases. In the present embodiment, a size of the unit area in the row direction and a size of the unit area in the column direction are assumed to be equal to each other in contrast to Embodiment 1. The length of one side of the unit area is desirably three times or more longer than the width of the wiring pattern in the touch screen, and is herein set to be approximately ten times longer than the width.

In FIG. 31, frequency distribution in the touch screen 40 shown in FIG. 22 in Embodiment 2 are indicated by a reference sign "FE2", and frequency distribution in the touch screen 80 shown in FIG. 29 in Embodiment 4 are indicated by a reference sign "FE4".

When a variation (3σ) of areas of the opening portions a1, b1, c1, and d1 is obtained in FIG. 30, the variation in the touch screen 40 shown in FIG. 22 is 14.1, and the variation in the touch screen 80 shown in FIG. 29 is 3.9. This means that the variation of the areas of the opening portions has been reduced in the touch screen 80 in FIG. 29 as positions at which the detection wires 82 and 83 intersect with each other are shifted so that the areas of the opening portions a1, b1, c1, and d1 are made uniform.

It can be understood from FIG. 31 that opening ratio distribution in the touch screen 80 shown in FIG. 29 is more continuous than opening ratio distribution in the touch screen 40 shown in FIG. 22. Specifically, the opening ratio distribution in the touch screen 40 shown in FIG. 22 has two portions in which a frequency of 0 continues, i.e., discontinuous portions. In the opening ratio distribution in the touch screen 80 shown in FIG. 29, the number of discontinuous portions is reduced to one.

These results suggest that reduction of the variation of the areas of the opening portions enclosed by the detection wires 82 and 83 makes the opening ratio distribution in the display screen continuous. A difference between opening ratios in adjacent unit areas provided on the display screen can be predicted to be reduced when the opening ratio distribution in the display screen becomes continuous, compared to a case where the opening ratio distribution is discrete.

The human vision has such characteristics that brightness and colors that people sense more largely depends on a relative amount of change in a surrounding environment than on an absolute amount of light. This is commonly known as lightness constancy, and is mainly caused by local concentration of pyramidal cells (photoreceptor cells that identify colors and brightness under photopic vision) in the vicinity of the center of the view point. Furthermore, the amount of perception (a perceptual dynamic range amount) with the human eyes adapting to ambient brightness is said to be approximately a hundredth of the amount of perception before adaptation. It can therefore be said that, if a difference between brightness at the center of the view point in the display screen and ambient brightness is equal to or smaller than 1%, distribution of brightness in the display screen is less likely to be viewed as uneven display as the difference falls below the amount of perception with the human eyes. In view of these perception characteristics, it can be said that distribution of brightness in the display screen desirably changes continuously in terms of making uneven display to be less likely to be visible.

When display screens of display apparatuses including the touch screens 40 and 80 shown in FIGS. 22 and 29 are actually visually compared with each other, uneven display is less likely to be visible in the touch screen 80 shown in FIG. 29. The opening ratio distribution in the touch screen 80 shown in FIG. 29 has a discontinuous portion having a range of more than 1% between opening ratios 0.8 to 0.9, but does not have any discontinuous portion having a range of approximately 5% as in the touch screen 40 shown in FIG. 22. This suggests that, even when the opening ratio distribution has any discontinuous portion, the difference between the opening ratios at the center of the view point and at a surrounding region is reduced by making the discontinuous portion small, and, as a result, uneven display is reduced. Although it is desirable that the change of the opening ratio be continuous to the extent that it falls below 1%, which is the amount of perception with the human eyes, uneven display is considered to be reduced when the change is smaller than a predetermined value.

The opening ratio distribution in the touch screen 40 shown in FIG. 22 has a discontinuous portion having a range of approximately 5%, and thus it is considered that there are many regions in which the difference between the opening ratios at the center of the view point and at the surrounding region exceeds 5% in the display screen using the touch screen 40 shown in FIG. 22. On the other hand, the opening ratio distribution in the touch screen 80 shown in FIG. 29 only has a discontinuous portion having a range of less than 5%, and thus it is considered that there are few regions in which the difference between the opening ratios at the center of the view point and at the surrounding region exceeds 5% in the display screen using the touch screen 80 shown in FIG. 29. It is therefore considered that uneven display can be reduced when the difference between the opening ratios at the center of the view point and at the surrounding region is equal to or smaller than 5% even if the opening ratio distribution is discrete.

As described above, the touch screen 80 in the present embodiment is characterized in that a plurality of reflected light distribution patterns are arranged so that curved portions, of the reflected light distribution patterns, parallel to the longitudinal direction of pixels of the display device are not aligned with each other in the longitudinal direction of the pixels, and areas of opening portions enclosed by fine wires provided on the transparent substrate and made of a light-reflective material are made uniform. With such configuration, the change of the opening ratio occurring between opening portions of the pixels can be reduced, and uneven display, such as moire, can be made to be less likely to be visible when the touch screen is mounted on the display device. The parts, of the curved portions of the reflected light distribution patterns, parallel to the longitudinal direction of the pixels can also be referred to as parts where normals are perpendicular to the longitudinal direction of the pixels. The term "uniform" means "substantially equal", and means that the areas may not be exactly the same, and may be different from one another to the extent that the change of the opening ratio can be suppressed without causing any problem.

When the basic pattern including a plurality of reflected light distribution patterns is repeatedly laid in the operation region, the reflected light distribution patterns included in the basic pattern are also arranged so that parts, of curved portions of the reflected light distribution patterns, parallel to the longitudinal direction of pixels of the display device are not aligned with each other in the longitudinal direction of the pixels, and areas of opening portions enclosed by fine wires provided on the transparent substrate and made of a light-reflective material are made uniform in the basic pattern in order to reduce the change of the opening ratio occurring between opening portions of pixels, and make uneven display, such as moire, to be less likely to be visible when the touch screen is mounted on the display device.

Embodiment 5

A touch screen 90 in Embodiment 5 of the present invention differs from the touch screens 40 and 80 in Embodiments 2 and 4 respectively show in FIGS. 22 and 29 in that positions of intersection portions where detection wires 92 and 93 intersect with each other are arranged so as not to be aligned with each other in the row direction x and in the column direction y in the basic pattern B.

Figure 32:
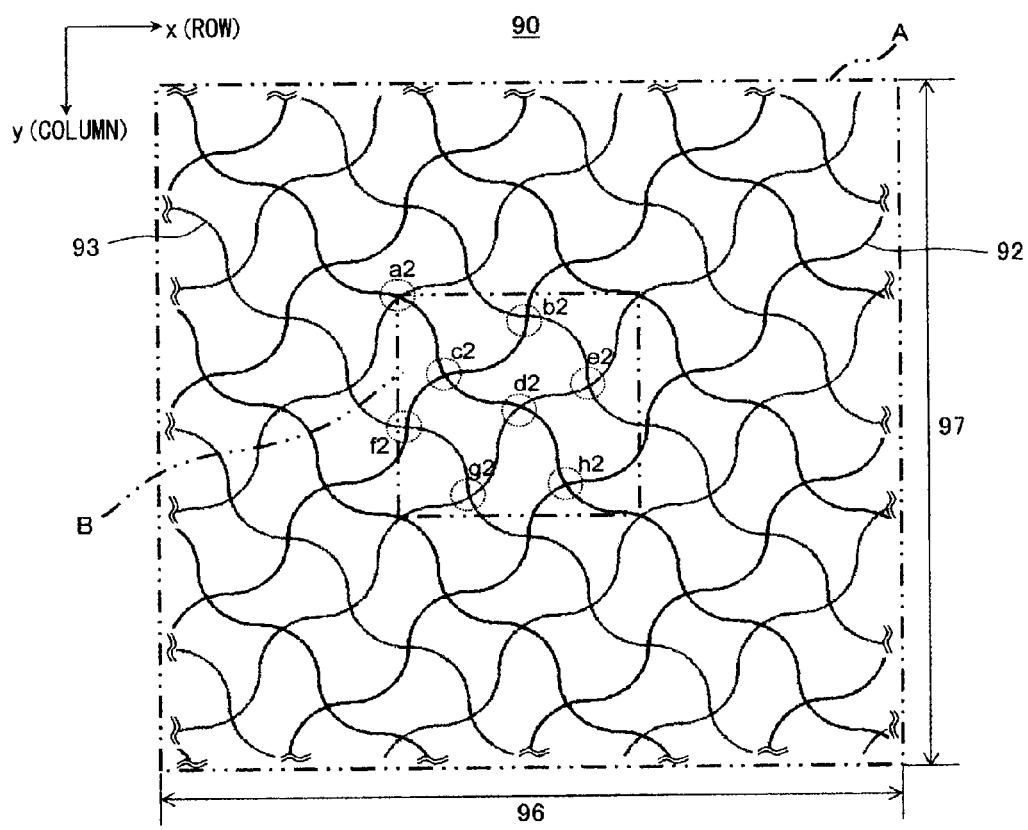
FIG. 32 is a projection showing a wiring pattern in a touch screen 90 in Embodiment 5 of the present invention.

FIG. 32 is a projection showing a wiring pattern in the touch screen 90 in the present embodiment. In FIG. 32, a portion at which a column-direction wire bundle and a row-direction wire bundle intersect with each other, i.e., a region A defined by the width 96 of the column-direction wire bundle and the width 97 of the row-direction wire bundle, is extracted.

As in the touch screen 40 shown in FIG. 22, the detection column wires 92 and the detection row wires 93 of the touch screen 90 only include curved portions, and include repetition of two 90° arcuate wavy fine wires connected together and having convex and concave portions extending upwards or downwards to the right. The detection column wires 92 and the detection row wires 93 of the touch screen 90 function as the reflected light distribution patterns.

The detection column wires 92 and the detection row wires 93 are arranged by shifting positions where the detection column wires 92 and the detection row wires 93 intersect with each other from the positions shown in FIG. 22 in Embodiment 2. Specifically, as in Embodiments 1 and 2, the detection wires 92 and 93 are arranged through shifting so that regions E, of the detection wires 92 and 93, parallel to the longitudinal direction of pixels are not aligned with each other in the longitudinal direction of the pixels in the basic pattern B. Furthermore, the detection wires 92 and 93 are arranged through shifting so that positions of intersection portions where the detection column wires 92 and the detection row wires 93 intersect with each other are not aligned with each other, i.e., the intersection portions are arranged at different positions, in the row direction x and in the column direction y in the basic pattern B. As a result, the regions E are dispersed not only in the transverse direction of the pixels but also in the longitudinal direction of the pixels. The detection wires are not limited to those having a shape only including a curved portion, and may have various shapes, for example, a shape including a linear portion as in Embodiment 1.

The intersection portions are formed by fine wires made of a light-reflective material. The fine wires forming the intersection portions block light from a display device when viewed from a direction normal to the front surface of the display device. In FIG. 32, the basic pattern B includes intersection portions a2, b2, c2, d2, e2, f2, g2, and h2 where detection wires 92 and 93 intersect with each other. The intersection portions a2, b2, d2, and f2 are portions where detection column wires 92 and detection row wires 93 intersect with each other. The intersection portions c2 and h2 are portions where two detection column wires 92 intersect with each other. The intersection portions e2 and g2 are portions where two detection row wires 93 intersect with each other. Arrangement positions of the intersection portions a2 to h2 included in the basic pattern B in the row direction x and in the column direction y differ from one another.

A region A in which the column-direction wire bundle and the row-direction wire bundle intersect with each other includes repetition of the basic pattern B including a plurality of detection column wires 92 and detection row wires 93.

The fine wires forming the intersection portions are not limited to detection wires. For example, any fine wire, such as a reflected light distribution pattern insulated from the detection wires and an isolated fine wire, provided on the transparent substrate and made of a light-reflective material may be used.

Furthermore, in FIG. 32, when a line passing through the center of the amplitude of the detection wires 92 and 93 in a direction perpendicular to the extension direction of the detection wires 92 and 93 is defined as a center line, intervals between center lines may be constant. By arranging adjacent center lines at equal intervals, wiring density is made uniform, and thus uneven display can be suppressed while maintaining detection sensitivity.

Figure 33:
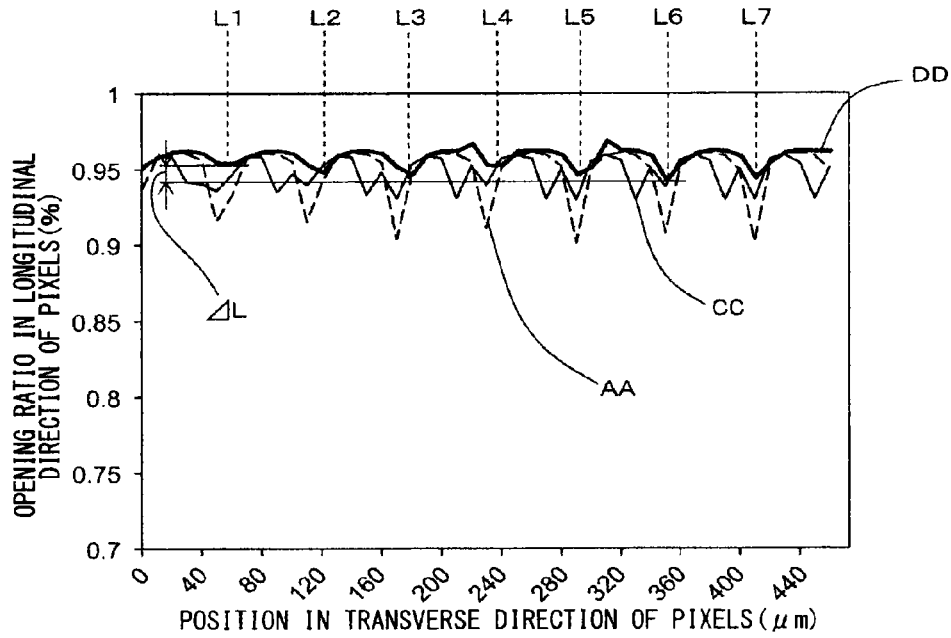
FIG. 33 is a graph showing opening ratio distribution in a longitudinal direction of pixels.

The following describes effects obtained in the present embodiment with use of FIG. 33.

FIG. 33 is a graph showing a change, in the transverse direction of pixels, of the opening ratio in the longitudinal direction of the pixels in the touch screen 40 shown in FIGS. 20 and 22 in Embodiment 2 and in the touch screen 90 shown in FIG. 32 in the present embodiment. The opening ratio is calculated by the method described in Embodiment 1. In FIG. 33, the change of the opening ratio in the touch screen 40 shown in FIG. 20 is indicated by AA (a dashed line), the change of the opening ratio in the touch screen 40 shown in FIG. 22 is indicated by CC (a solid line), and the change of the opening ratio in the touch screen 90 shown in FIG. 32 is indicated by DD (a bold solid line).

In the touch screen 40 shown in FIG. 20, detection wires 42 and 43 are arranged so that intersection portions of the detection wires 42 and 43 are aligned with each other in the row direction x and in the column direction y in the basic pattern B. Regions, of the detection wires 42 and 43, parallel to the longitudinal direction of the pixels of the display device are thus aligned with each other in the longitudinal direction of the pixels. As a result, a dark portion where the opening ratio significantly reduces (a portion where the opening ratio has a minimum value) appears periodically in the opening ratio AA shown in FIG. 33.

In the touch screen 40 shown in FIG. 22, detection wires 42 and 43 are arranged so that regions E, of the detection wires 42 and 43, parallel to the longitudinal direction of the pixels are not aligned with each other in the longitudinal direction of the pixels. Therefore, the change (a difference between a maximum value and a minimum value) of the opening ratio CC is smaller than that of the opening ratio AA, but still exceeds 3%.

In contrast, in the touch screen 90 in the present embodiment, detection wires 92 and 93 are dispersed so that all the intersection portions a2 to h2 of the detection wires 92 and 93 included in the basic pattern B do not overlap each other in the row direction x and in the column direction y. Regions, of the detection wires 92 and 93, parallel to the longitudinal direction of the pixels of the display device are thus more dispersed. As a result, the change of the opening ratio DD is reduced to 3% or smaller, and uneven display is not visible.

Dark portions L1 to L7 of the opening ratio DD shown in FIG. 33 have different opening ratios. However, a difference ΔL between an opening ratio in the dark portion L1 where the opening ratio is the largest and an opening ratio in the dark portion L6 where the opening ratio is the smallest is equal to or smaller than 1%, and cannot be identified with the human eyes. A repetition period of the dark portion of the opening ratio DD is thus 0.1 mm or less. It is commonly said that a size of an object that is visible with the naked eyes is approximately 0.1 mm, and thus the dark portions of the opening ratio DD are not viewed as moire.

Furthermore, in the opening ratio DD shown in FIG. 33, darks portions having different opening ratios appear with a repetition period of 0.1 mm or more. Specifically, the dark portions L1, L3, L5, and L7 are dark portions having a first opening ratio, and the dark portions L2, L4, and L6 are dark portions having a second opening ratio in FIG. 33. The repetition period of each of the dark portions is 0.1 mm or more. However, since the difference ΔL of the first opening ratio and the second opening ratio is equal to or smaller than 1%, and cannot be identified with the human eyes, the repetition period of the dark portions of the opening ratio DD may be considered to be reduced to 0.1 mm or less. The dark portions of the opening ratio DD are thus not viewed as moire.

As described above, the touch screen 90 in the present embodiment is characterized in that reflected light distribution patterns are arranged so that regions, of curved portions of the reflected light distribution patterns, parallel to the longitudinal direction of the pixels of the display device are not aligned with each other in the longitudinal direction of the pixels, and intersection portions formed by fine wires provided on the transparent substrate and made of a light-reflective material are dispersed so as not to overlap each other in the row direction x and in the column direction y. With such configuration, the change of the opening ratio occurring between opening portions of the pixels of the display apparatus can be reduced, and uneven display, such as moire, can be made to be less likely to be visible when the display apparatus is equipped with the touch screen. The regions, of the curved portions of the reflected light distribution patterns, parallel to the longitudinal direction of the pixels can also be referred to as regions in which normals are perpendicular to the longitudinal direction of the pixels.

When the basic pattern including a plurality of reflected light distribution patterns is repeatedly laid in the operation region, the reflected light distribution patterns are also arranged so that parts, of curved portions of the reflected light distribution patterns, parallel to the longitudinal direction of the pixels of the display device are not aligned with each other in the longitudinal direction of the pixels, and intersection portions formed by fine wires provided on the transparent substrate and made of a light-reflective material are dispersed in the basic pattern so as not to be aligned with each other in the row direction x and in the column direction y in order to reduce the change of the opening ratio occurring between the opening portions of the pixels, and make uneven display, such as moire, to be less likely to be visible when the touch screen is mounted on the display device.

As in Embodiment 4, uneven display, such as moire, is made to be less likely to be visible in the present embodiment by arranging fine wires so that areas of opening portions enclosed by fine wires provided on the transparent substrate and made of a light-reflective material are made uniform.

Embodiment 6

Figure 34:
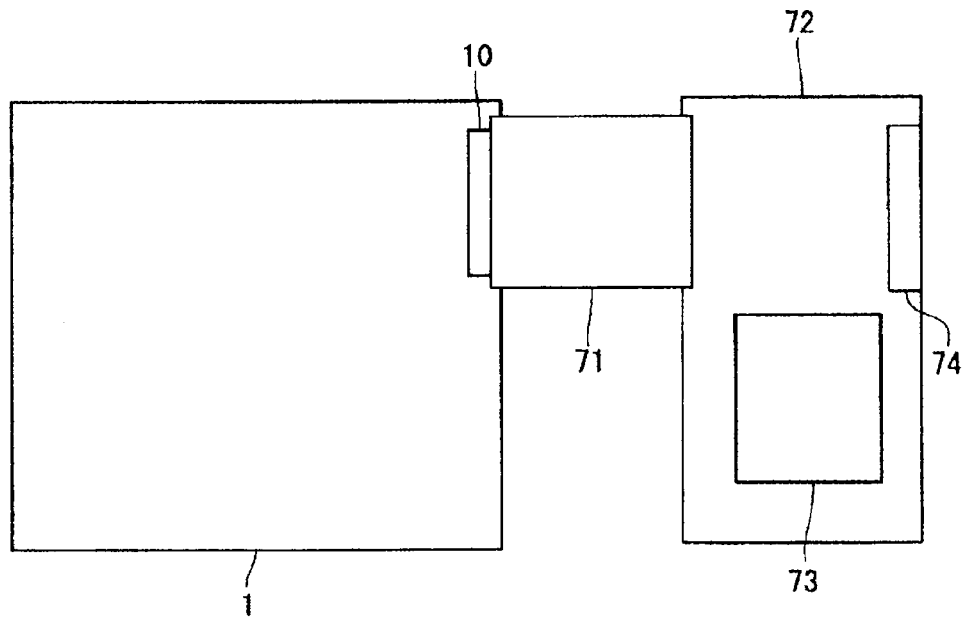
FIG. 34 is a projection schematically showing the configuration of a touch panel 70 in Embodiment 6 of the present invention.

FIG. 34 is a plan view schematically showing the configuration of a touch panel 70. The touch panel 70 includes the touch screen 1 in Embodiment 1 shown in FIG. 1 described above, a flexible printed board 71, and a controller board 72.

Terminals of the flexible printed board 71 are implemented on corresponding terminals 10 of the touch screen 1 with use of an anisotropic conductive film (ACF) and the like. End portions of the detection wires 2 and 3 of the touch screen 1 are electrically connected to the controller board 72 via the flexible printed board 71, so that the touch screen 1 functions as a major component of the touch panel 70.

A detection processing circuit 73 is mounted on the controller board 72. The detection processing circuit 73 performs processing to detect touch capacitance including electrostatic capacitance formed between an indicator and the column-direction wire bundles 6 and the row-direction wire bundles 7 through application of a signal voltage, and to calculate a touch position, on the touch screen 1, indicated with the indicator based on results of the detection.

Projected capacitive detection logic can be adopted to the detection processing circuit 73. The controller board 72 includes an external-connection terminal 74 to output results of calculation processing of touch coordinates performed by the detection processing circuit 73 to an external processing apparatus.

As described above, the touch panel 70 in the present embodiment includes the above-mentioned touch screen 1 in Embodiment 1. The touch screen 1 has high visibility as described above, and can increase wiring density without increasing line capacitance. With use of the touch screen 1 having such configuration, the touch panel 70 of a projected capacitive type that can be increased in size without reducing detection sensitivity of touch capacitance can be provided.

Although the touch panel 70 includes the above-mentioned touch screen 1 in Embodiment 1 in the present embodiment, the touch panel 70 may include any of the above-mentioned touch screens 40, 50, 80, and 90 in Embodiments 2 to 5 in place of the touch screen 1. The detection processing circuit 73 and other components on the controller board 72 may directly be provided on the transparent substrate 19 rather than on the controller board 72.

Embodiment 7

A display apparatus in Embodiment 7 of the present invention includes the above-mentioned touch panel 70 shown in FIG. 34 and a display device. Examples of the display device include a liquid crystal display (LCD), a plasma display panel (PDP), and an organic light-emitting display (OLED). The touch panel 70 is disposed so as to be closer to a user than a display screen of the display device is. By providing the touch panel 70 so as to be closer to the user than the display screen of the display device is as described above, the display apparatus including a touch panel having a function of detecting a touch position indicated by the user can be achieved.

Figure 35:
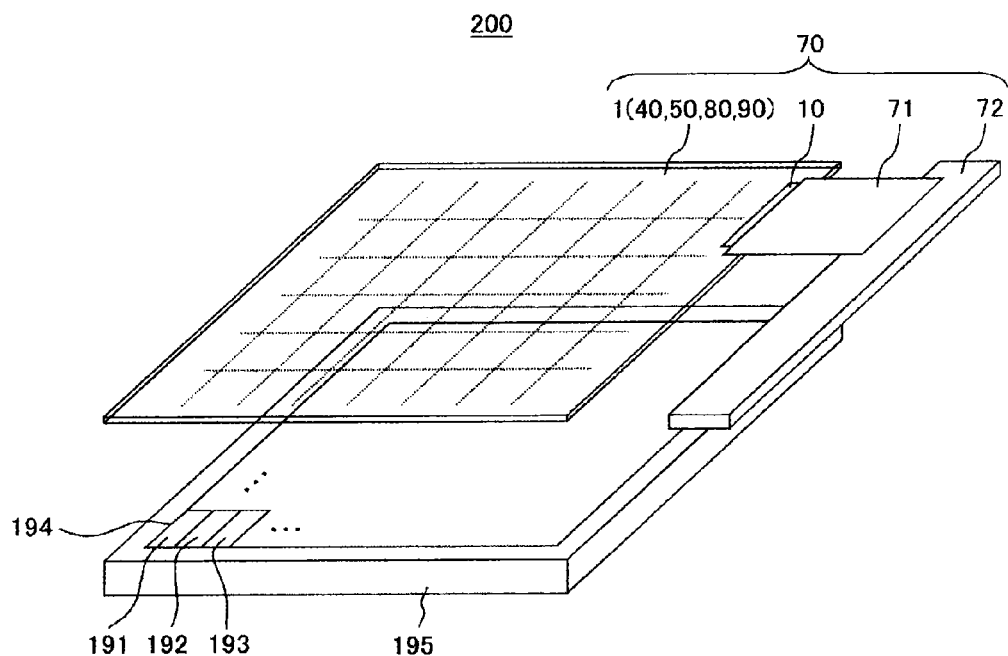
FIG. 35 is a perspective view schematically showing the configuration of a display apparatus 200 in Embodiment 7 of the present invention.

FIG. 35 is a perspective view schematically showing the configuration of a display apparatus 200 in the present embodiment. The display apparatus 200 includes a display device 195 and the above-mentioned touch panel 70 in Embodiment 6. The touch panel 70 includes any of the above-mentioned touch screens 1, 40, 50, 80, and 90 in Embodiments 1 to 5. For example, red pixels 191, green pixels 192, blue pixels 193, and a black matrix 194 are arranged in the display device 195. Only some of the red, green, and blue pixels and a part of the black matrix are illustrated in FIG. 35 for convenience' sake.

The display apparatus in the present embodiment includes the touch panel 70 including the touch screen 1 having high visibility as described above. As a result, a display apparatus including a projected capacitive touch panel having high visibility can be provided.

Embodiment 8

An electronic instrument in Embodiment 8 of the present invention includes the above-mentioned touch panel 70 shown in FIG. 34 and a signal processing device, which is an electron device. The signal processing device receives, as input, output of the external-connection terminal 74 of the touch panel 70, and outputs it as a digital signal. By connecting the signal processing device to the touch panel 70, an electronic instrument having a touch position detection function, such as a digitizer, that outputs a detected touch position indicated by a user to an external signal processing apparatus, such as a computer, can be achieved.

The signal processing device may be incorporated into the controller board 72. The signal processing device has an output function that meets a bus standard, such as Universal Serial Bus (USB), so that a highly versatile electronic instrument having the touch position detection function can be achieved.

As described above, the electronic instrument includes the above-mentioned touch screen 1 having high visibility in the present embodiment. As a result, a projected capacitive electronic instrument having the touch position detection function and having high visibility can be provided.

It should be noted that the present invention can be implemented by freely combining any of the above-mentioned embodiments within the scope of the present invention, and any components in the above-mentioned embodiments can be modified or omitted as appropriate.

The invention claimed is:

1. A display apparatus comprising:
a display device having pixels;
a touch screen disposed on a display screen side of said display device; and
a touch position detection circuit detecting a position, on said touch screen, indicated with an indicator based on electrostatic capacitance formed between said indicator and said touch screen, wherein
said touch screen includes:
  a plurality of column wires extending in a predetermined column direction, and arranged at intervals in a row direction that intersects with said column direction;
  a plurality of row wires extending in said row direction, and arranged at intervals in said column direction; and
  a transparent substrate over which said column wires and said row wires are provided so as to intersect with each other in three dimensions while being electrically insulated from each other,
said column wires and said row wires are made of a light-reflective conductive material,
said column wires are divided into a plurality of column-direction wire bundles each including a predetermined number of column wires electrically connected to one another, the predetermined number being more than one,
said row wires are divided into a plurality of row-direction wire bundles each including a predetermined number of row wires electrically connected to one another, the predetermined number being more than one,
a plurality of reflected light distribution patterns are provided over said transparent substrate, the reflected light distribution patterns being made of a light-reflective material,
said reflected light distribution patterns each include a curved portion that is curved when viewed from a direction perpendicular to a surface, of said transparent substrate, facing a user, and are arranged so that hypothetical normals to said curved portions are directed towards all directions, and
said reflected light distribution patterns are arranged so that adjacent reflected light distribution patterns among said reflected light distribution patterns in a planar view that are in a longitudinal direction of said pixels are not aligned with each other in the longitudinal direction.

2. The display apparatus according to claim 1, wherein said reflected light distribution patterns are included in at least said column wires or said row wires.

3. The display apparatus according to claim 1, wherein said reflected light distribution patterns are provided so as to be insulated from at least said column wires or said row wires.

4. The display apparatus according to claim 1, wherein center lines of amplitude of said column wires and said row wires are arranged at equal intervals.

5. The display apparatus according to claim 1, wherein areas of opening portions enclosed by fine wires provided on said transparent substrate and made of a light-reflective material are uniform.

6. The display apparatus according to claim 1, wherein intersection portions formed by fine wires provided on said transparent substrate and made of a light-reflective material are arranged so as not to be aligned with each other in said row direction and in said column direction.

7. The display apparatus according to claim 1, wherein each of regions in which said column-direction wire bundles and said row-direction wire bundles intersect with each other includes repetition of a basic pattern including a plurality of said reflected light distribution patterns, said reflected light distribution patterns included in said basic pattern are arranged so that parts, of curved portions, parallel to a longitudinal direction of said pixels are not aligned with each other in the longitudinal direction of said pixels.

8. The display apparatus according to claim 1, wherein in each of said reflected light distribution patterns, a fine wire including said curved portion is closed.

9. The display apparatus according to claim 8, wherein each of said reflected light distribution patterns includes a closed fine wire, and has a concave portion when viewed from the direction perpendicular to the surface, of said transparent substrate, facing the user.

10. A display apparatus comprising:
a display device having pixels;
a touch screen disposed on a display screen side of said display device; and
a touch position detection circuit detecting a position, on said touch screen, indicated with an indicator based on electrostatic capacitance formed between said indicator and said touch screen, wherein
said touch screen includes:
  a plurality of column wires extending in a predetermined column direction, and arranged at intervals in a row direction that intersects with said column direction;
  a plurality of row wires extending in said row direction, and arranged at intervals in said column direction; and
  a transparent substrate over which said column wires and said row wires are provided so as to intersect with each other in three dimensions while being electrically insulated from each other,
said column wires and said row wires are made of a light-reflective conductive material,
said column wires are divided into a plurality of column-direction wire bundles each including a predetermined number of column wires electrically connected to one another, the predetermined number being more than one, said row wires are divided into a plurality of row-direction wire bundles each including a predetermined number of row wires electrically connected to one another, the predetermined number being more than one, a plurality of reflected light distribution patterns are provided over said transparent substrate, the reflected light distribution patterns being made of a light-reflective material, said reflected light distribution patterns each include a curved portion that is curved when viewed from a direction perpendicular to a surface, of said transparent substrate, facing a user, and are arranged so that hypothetical normals to said curved portions are directed towards all directions, and said reflected light distribution patterns are dispersedly arranged so that in adjacent reflected light distribution patterns among said reflected light distribution patterns in a planar view that are in a longitudinal direction of said pixels, parts of curved portions in which the normals are perpendicular to the longitudinal direction are displaced from each other in the longitudinal direction.

* * * * *